(12) United States Patent
Minakata

(10) Patent No.: US 6,809,875 B2
(45) Date of Patent: Oct. 26, 2004

(54) EYEPIECE OPTICAL SYSTEM

(75) Inventor: Hiroyuki Minakata, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/700,572

(22) Filed: Nov. 5, 2003

(65) Prior Publication Data

US 2004/0090666 A1 May 13, 2004

(30) Foreign Application Priority Data

Nov. 8, 2002 (JP) ........................................ 2002-325515

(51) Int. Cl.$^7$ .............................................. G02B 25/00
(52) U.S. Cl. ...................... 359/645; 359/643; 359/646
(58) Field of Search ................................. 359/643–647, 359/640, 627, 689; 396/384

(56) References Cited

U.S. PATENT DOCUMENTS

| | | | |
|---|---|---|---|
| 5,570,229 A | 10/1996 | Kanamori | 359/431 |
| 5,625,486 A | 4/1997 | Mori et al. | 359/689 |
| 5,659,427 A | 8/1997 | Iyama | 359/689 |
| 5,982,557 A * | 11/1999 | Moriyama | 359/646 |
| 6,362,924 B2 * | 3/2002 | Ohno | 359/689 |
| 6,692,163 B2 * | 2/2004 | Ogata | 396/354 |

FOREIGN PATENT DOCUMENTS

| | | |
|---|---|---|
| JP | 10-311957 | 11/1998 |
| JP | 11-064744 | 3/1999 |

* cited by examiner

Primary Examiner—Georgia Epps
Assistant Examiner—M. Hasan
(74) Attorney, Agent, or Firm—Pillsbury Winthrop LLP

(57) ABSTRACT

An eyepiece optical system is interposed between the positions of an intermediate image and a pupil in a finder and includes, in order from the intermediate-image side, a first lens unit having a negative lens located at the most intermediate-image-side position and a second lens unit provided with a path-bending optical member and having positive power as a whole, satisfying the following condition:

$$-20 < sf1 < 0$$

where sf1 is the shaping factor of the negative lens and is expressed as $(r11+r12)/(r11-r12)$, where r11 is the radius of curvature of the intermediate-image-side surface of the negative lens and r12 is the radius of curvature of the pupil-side surface of the negative lens.

15 Claims, 23 Drawing Sheets

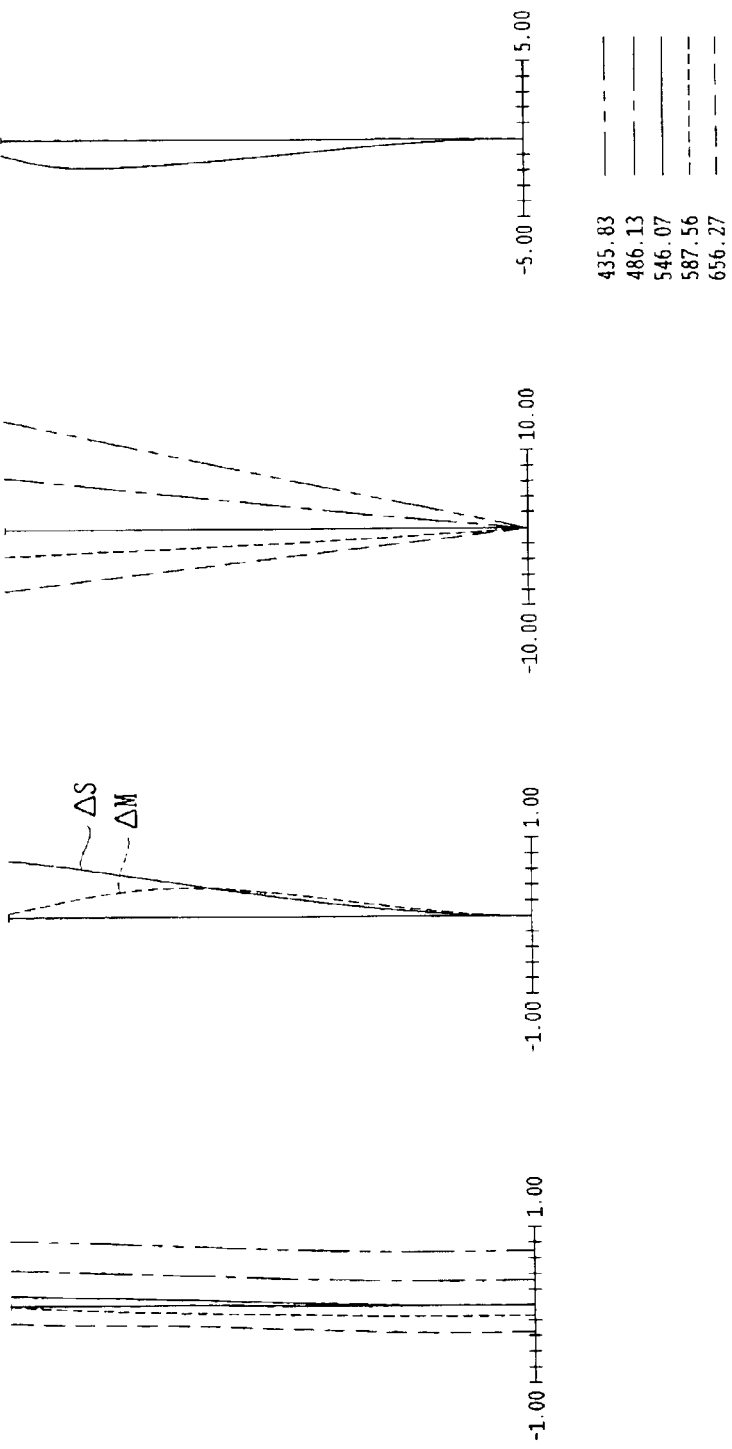

SPHERICAL ABERRATION (dp)
NA 0.140

ASTIGMATISM (dp)
IH 2.52

CHROMATIC ABERRATION OF MAGNIFICATION (a)
IH 2.52

DISTORTION (%)
IH 2.52

435.83
486.13
546.07
587.56
656.27

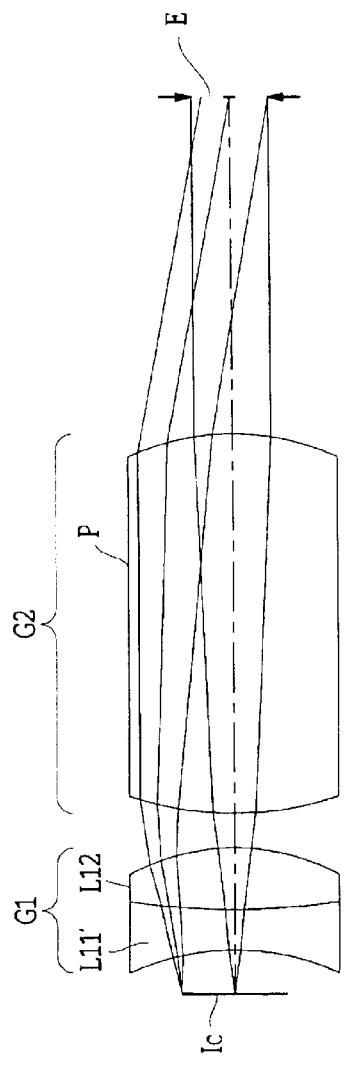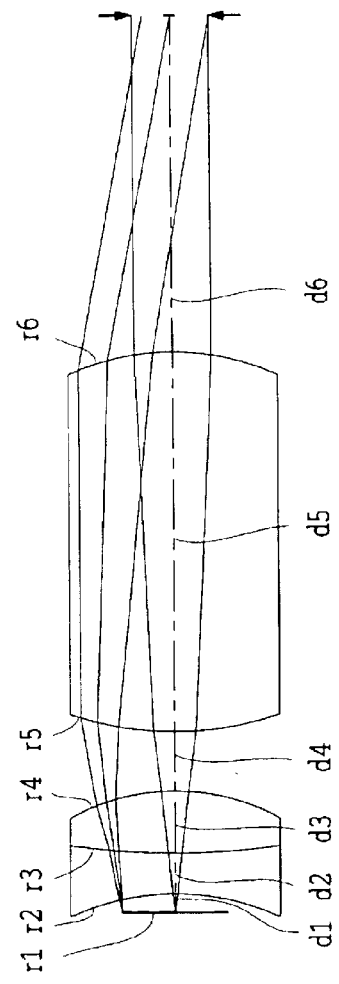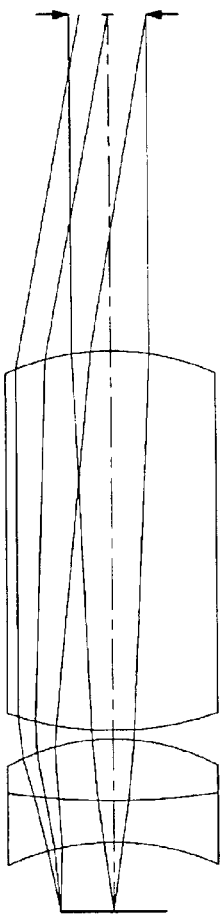
FIG. 7A
FIG. 7B
FIG. 7C

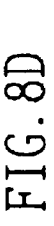
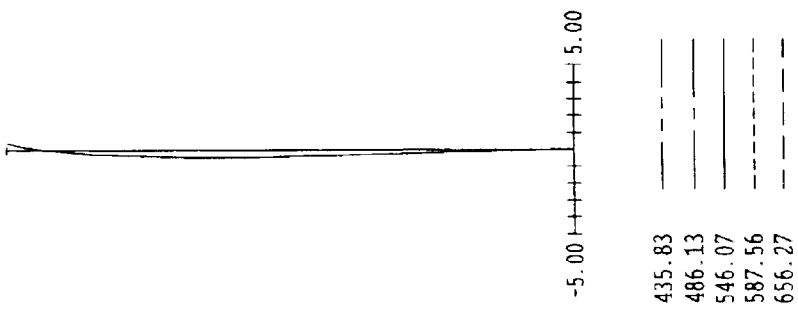
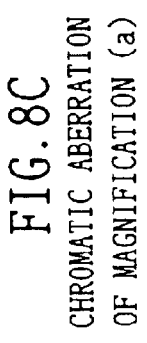
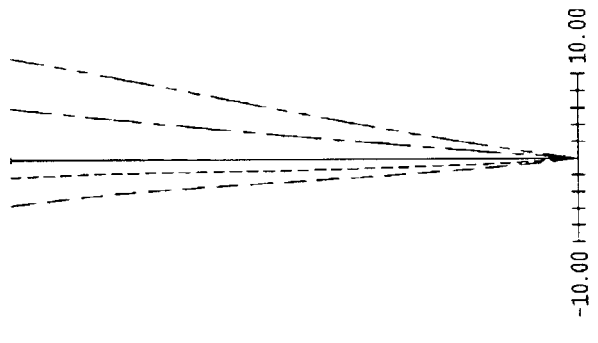
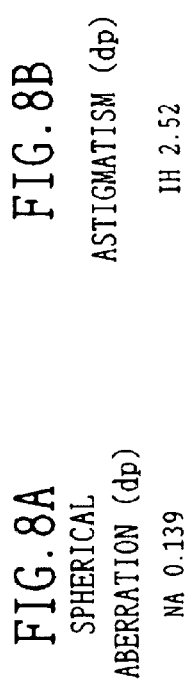
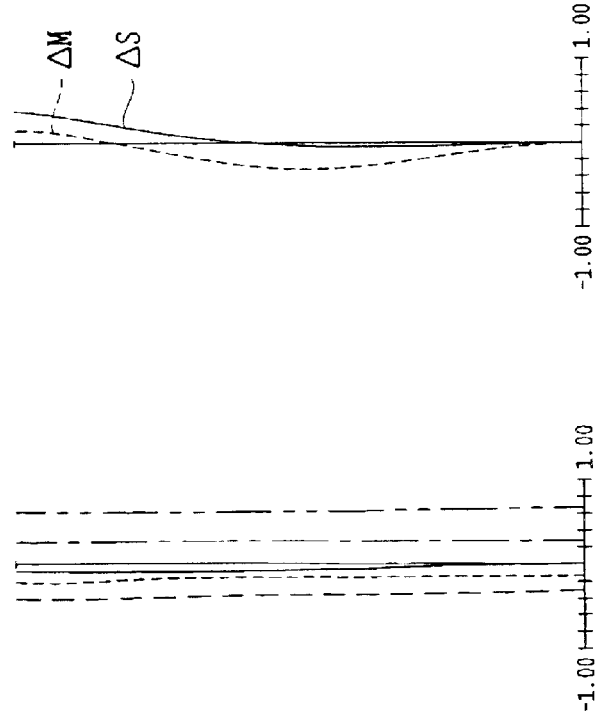

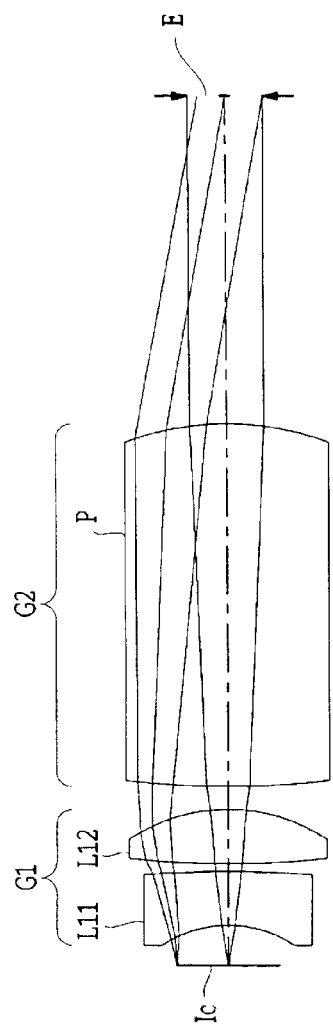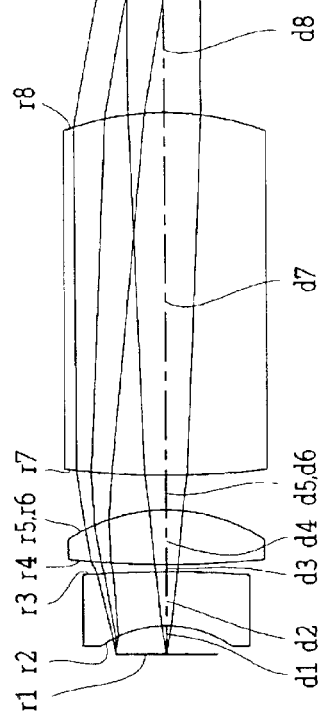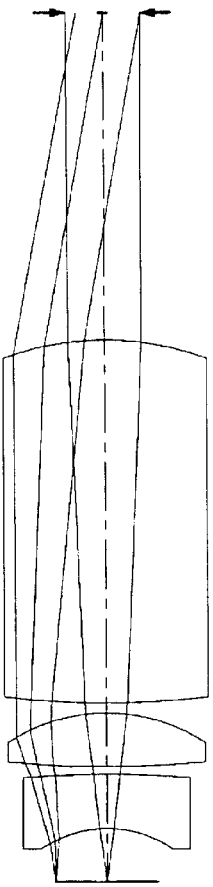
FIG. 9A
FIG. 9B
FIG. 9C

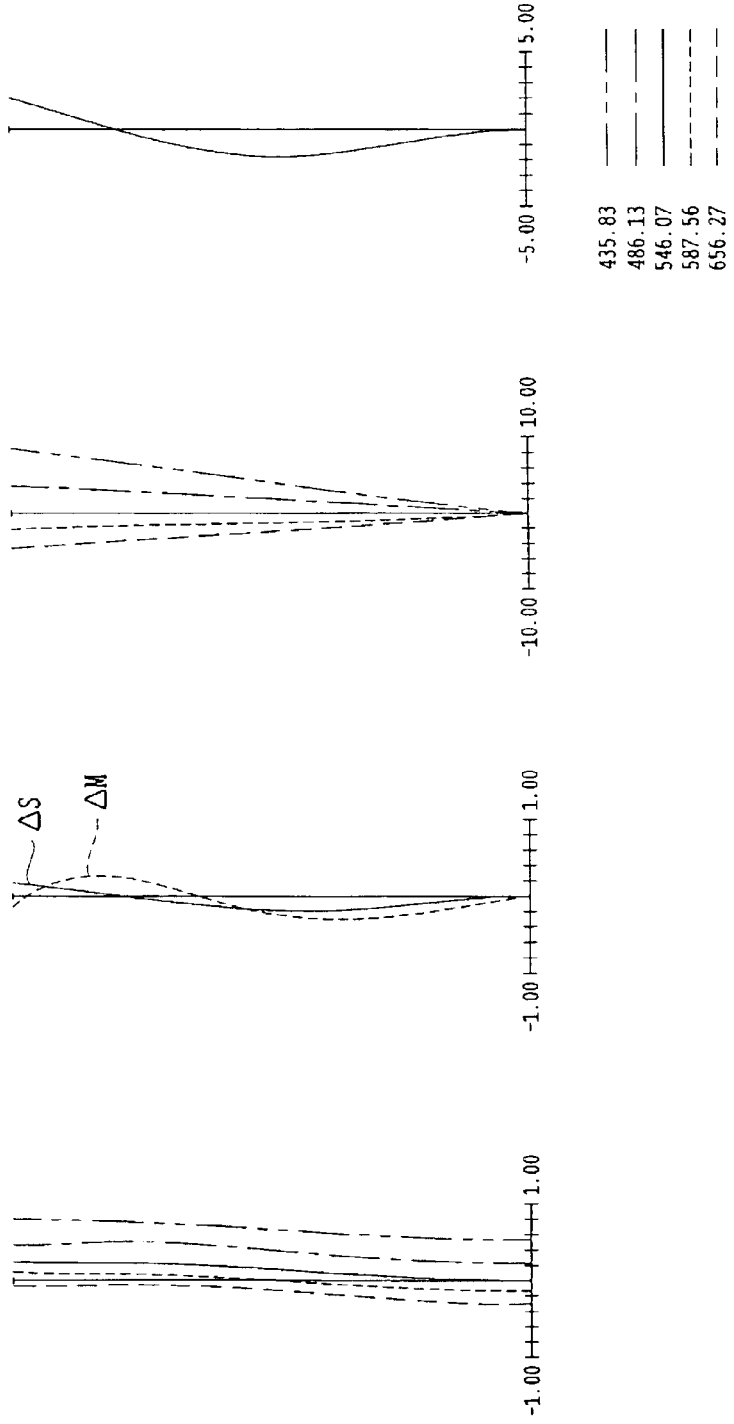

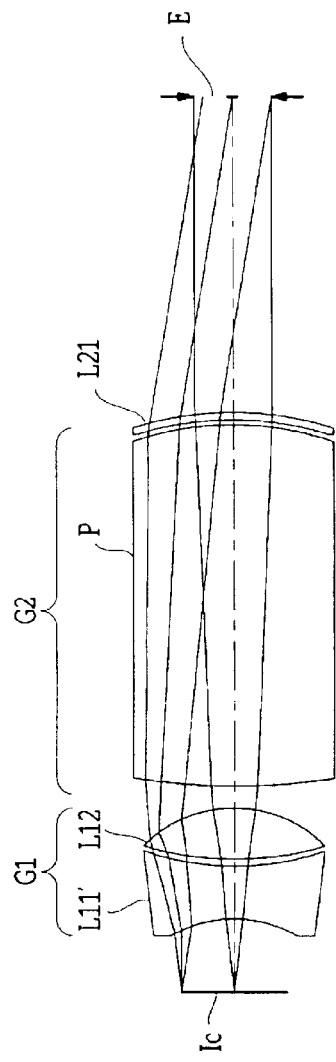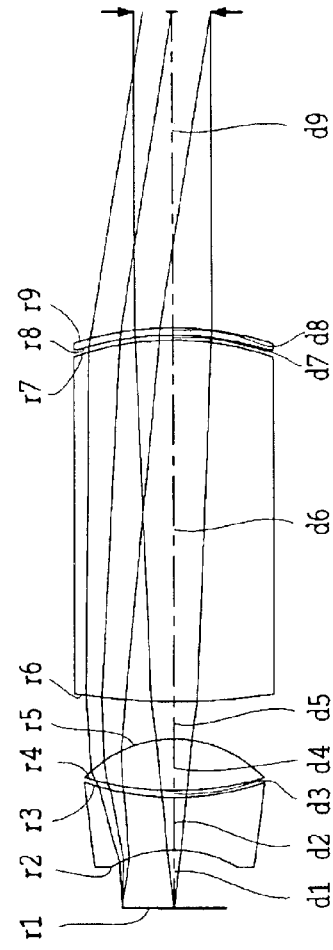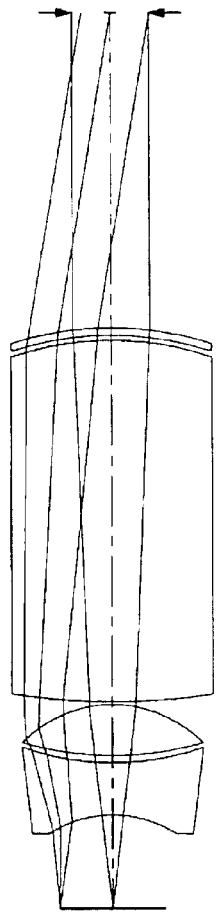
FIG. 12A
FIG. 12B
FIG. 12C

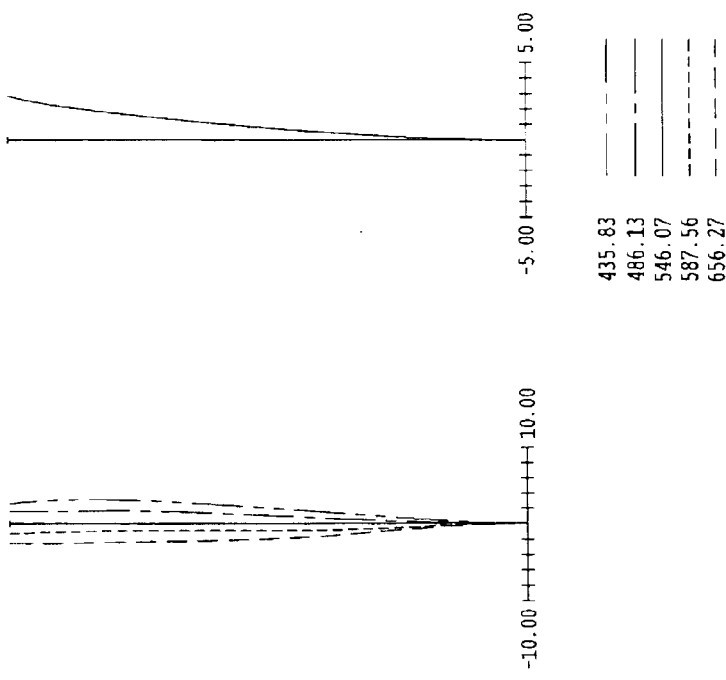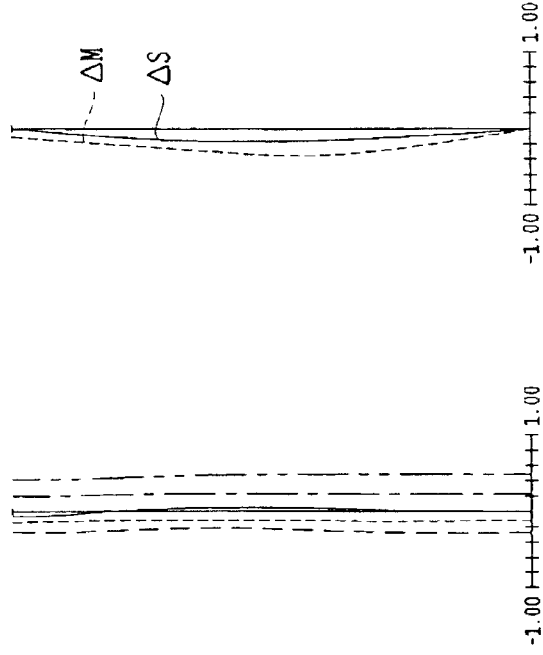

FIG.15A
SPHERICAL
ABERRATION (dp)
FNO 248.044
FIG.15B
ASTIGMATISM (dp)
IH 25.34
FIG.15C
CHROMATIC ABERRATION
OF MAGNIFICATION (a)
IH 25.34
FIG.15D
DISTORTION (%)
IH 25.34
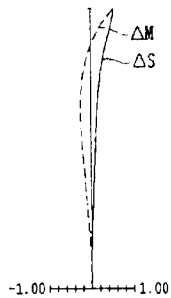
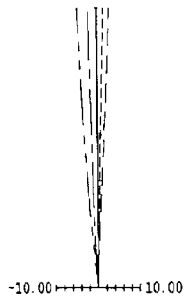
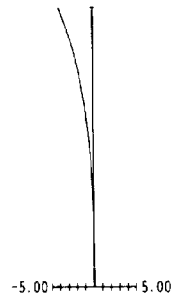
435.83 — — — —
486.13 — — — —
546.07 ————
587.56 - - - - - -
656.27 — — — —
FIG.16A
SPHERICAL
ABERRATION (dp)
FNO 247.008
FIG.16B
ASTIGMATISM (dp)
IH 15.56
FIG.16C
CHROMATIC ABERRATION
OF MAGNIFICATION (a)
IH 15.56
FIG.16D
DISTORTION (%)
IH 15.56
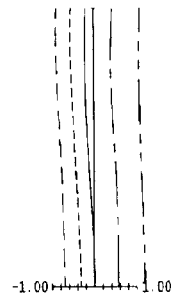
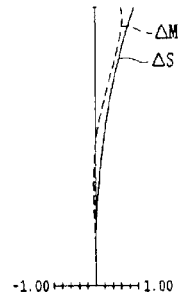
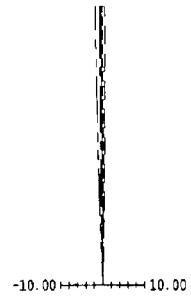
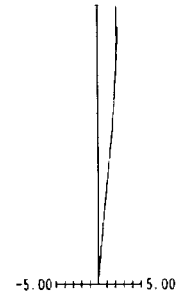
435.83 — — — —
486.13 — — — —
546.07 ————
587.56 - - - - - -
656.27 — — — —
FIG.17A
SPHERICAL
ABERRATION (dp)
FNO 245.039
FIG.17B
ASTIGMATISM (dp)
IH 9.43
FIG.17C
CHROMATIC ABERRATION
OF MAGNIFICATION (a)
IH 9.43
FIG.17D
DISTORTION (%)
IH 9.43
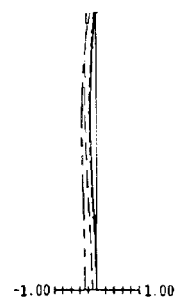
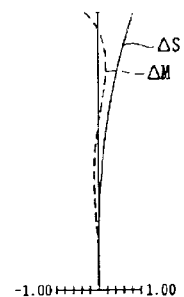
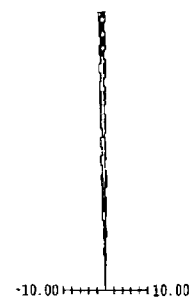
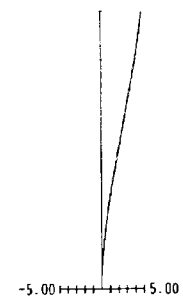
435.83 — — — —
486.13 — — — —
546.07 ————
587.56 - - - - - -
656.27 — — — —

FIG.19A
SPHERICAL
ABERRATION (dp)
FNO 274.854
FIG.19B
ASTIGMATISM (dp)
IH 25.34
FIG.19C
CHROMATIC ABERRATION
OF MAGNIFICATION (a)
IH 25.34
FIG.19D
DISTORTION (%)
IH 25.34
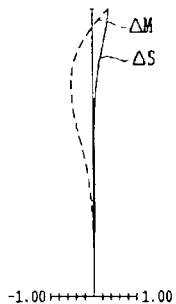
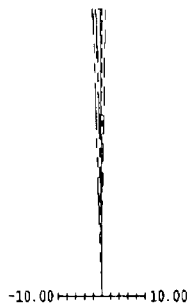
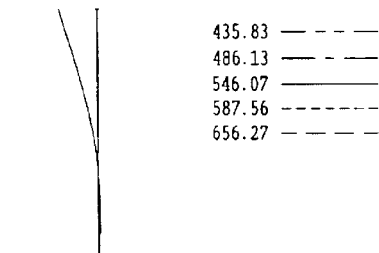
FIG.20A
SPHERICAL
ABERRATION (dp)
FNO 294.835
FIG.20B
ASTIGMATISM (dp)
IH 15.56
FIG.20C
CHROMATIC ABERRATION
OF MAGNIFICATION (a)
IH 15.56
FIG.20D
DISTORTION (%)
IH 15.56
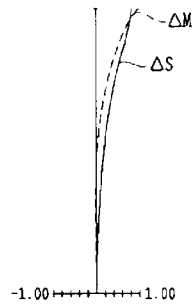
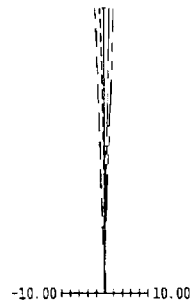
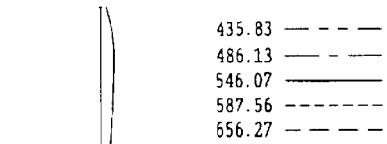
FIG.21A
SPHERICAL
ABERRATION (dp)
FNO 380.267
FIG.21B
ASTIGMATISM (dp)
IH 9.43
FIG.21C
CHROMATIC ABERRATION
OF MAGNIFICATION (a)
IH 9.43
FIG.21D
DISTORTION (%)
IH 9.43
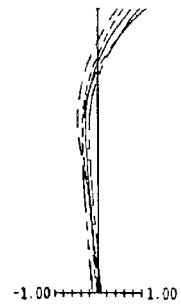
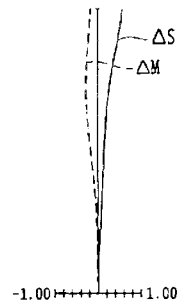
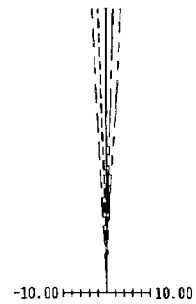
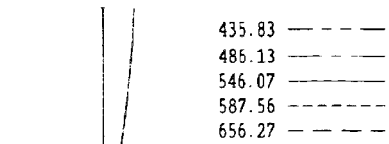

SPHERICAL
ABERRATION (dp)
FNO 246.107

ASTIGMATISM (dp)
IH 25.34

CHROMATIC ABERRATION
OF MAGNIFICATION (a)
IH 35.34

DISTORTION (%)
IH 25.34

```
435.83 — — — —
486.13 — — —
546.07 ————
587.56 --------
656.27 — — — —
```

SPHERICAL
ABERRATION (dp)
FNO 299.396

ASTIGMATISM (dp)
IH 15.56

CHROMATIC ABERRATION
OF MAGNIFICATION (a)
IH 15.56

DISTORTION (%)
IH 15.56

```
435.83 — — — —
486.13 — — —
546.07 ————
587.56 --------
656.27 — — — —
```

SPHERICAL
ABERRATION (dp)
FNO 473.713

ASTIGMATISM (dp)
IH 9.43

CHROMATIC ABERRATION
OF MAGNIFICATION (a)
IH 9.43

DISTORTION (%)
IH 9.43

```
435.83 — — — —
486.13 — — —
546.07 ————
587.56 --------
656.27 — — — —
```

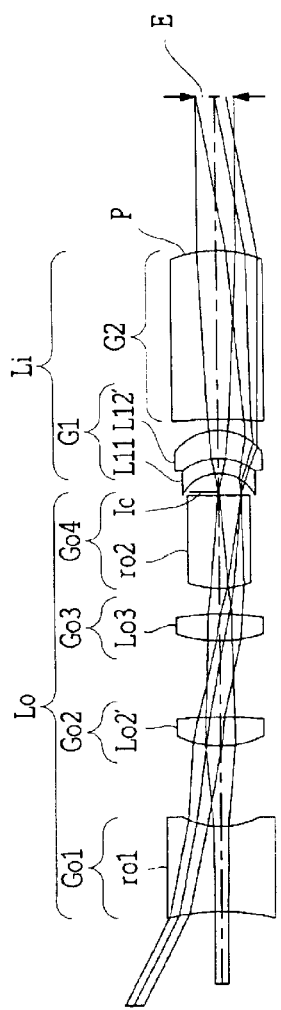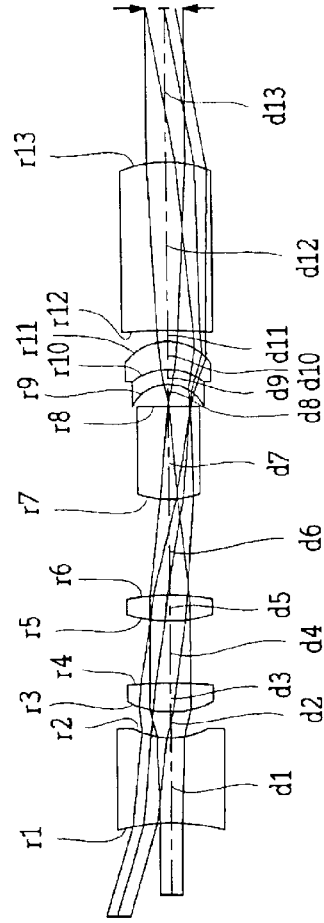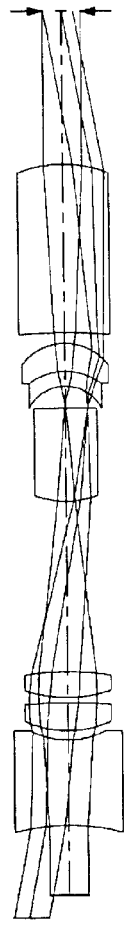
FIG. 26A
FIG. 26B
FIG. 26C

FIG. 27A
SPHERICAL
ABERRATION (dp)
FNO 251.643
FIG. 27B
ASTIGMATISM (dp)
IH 25.34
FIG. 27C
CHROMATIC ABERRATION
OF MAGNIFICATION (a)
IH 35.34
FIG. 27D
DISTORTION (%)
IH 25.34
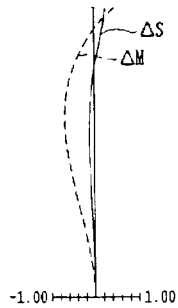
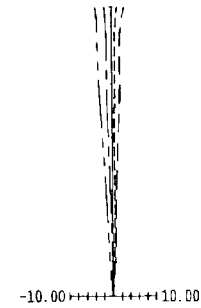
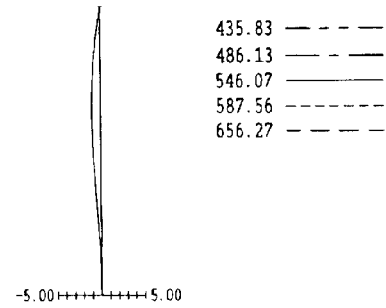
435.83 — - - —
486.13 — - - —
546.07 ———
587.56 - - - - -
656.27 — — —
FIG. 28A
SPHERICAL
ABERRATION (dp)
FNO 251.516
FIG. 28B
ASTIGMATISM (dp)
IH 15.56
FIG. 28C
CHROMATIC ABERRATION
OF MAGNIFICATION (a)
IH 15.56
FIG. 28D
DISTORTION (%)
IH 15.56
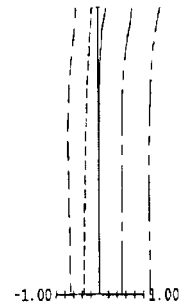
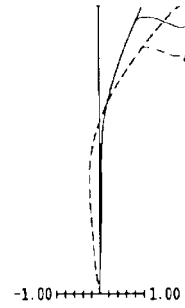
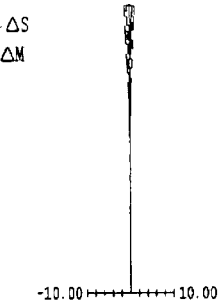
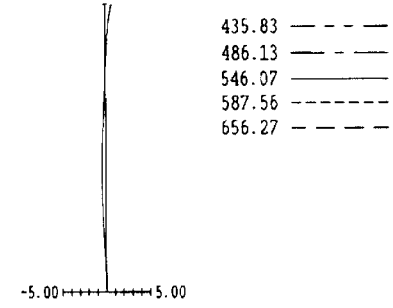
435.83 — - - —
486.13 — - - —
546.07 ———
587.56 - - - - -
656.27 — — —
FIG. 29A
SPHERICAL
ABERRATION (dp)
FNO 228.938
FIG. 29B
ASTIGMATISM (dp)
IH 9.43
FIG. 29C
CHROMATIC ABERRATION
OF MAGNIFICATION (a)
IH 9.43
FIG. 29D
DISTORTION (%)
IH 9.43
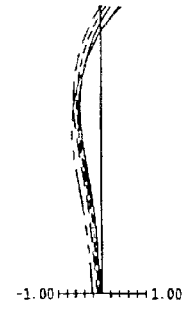
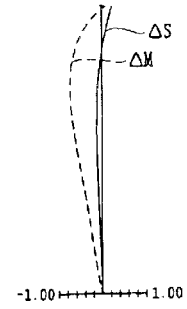
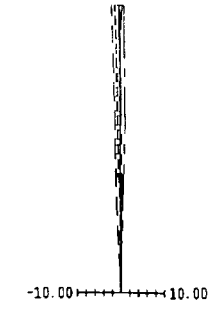
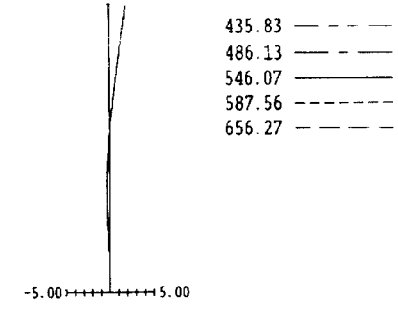
435.83 — - - —
486.13 — - - —
546.07 ———
587.56 - - - - -
656.27 — — —

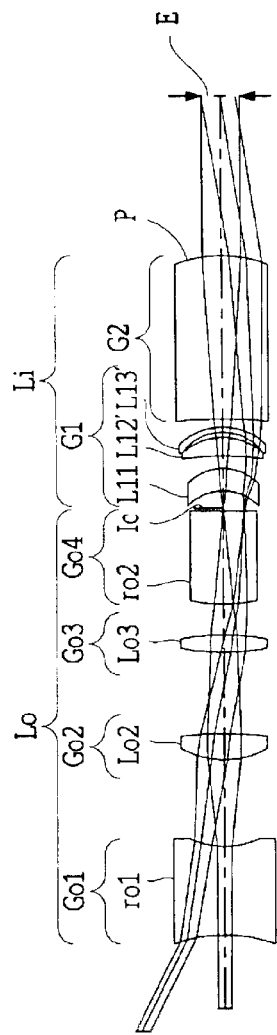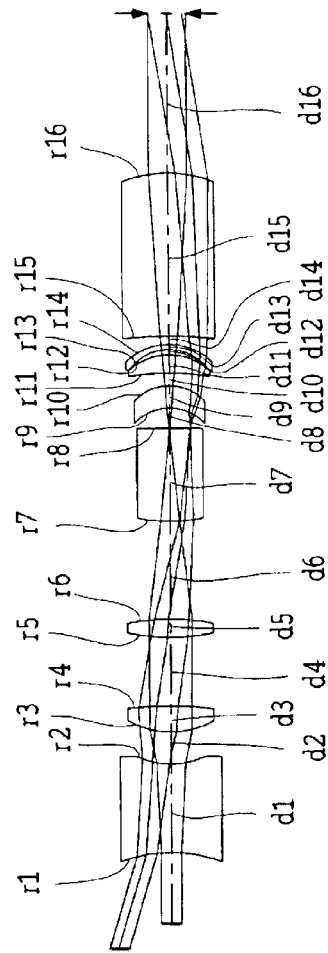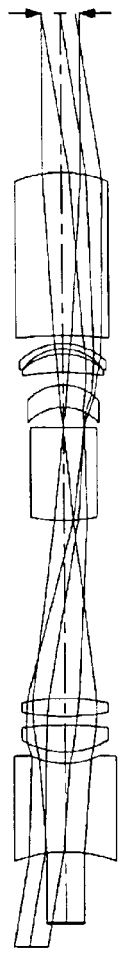
FIG. 31A
FIG. 31B
FIG. 31C

SPHERICAL
ABERRATION (dp)
FNO 281.122

ASTIGMATISM (dp)
IH 25.34

CHROMATIC ABERRATION
OF MAGNIFICATION (a)
IH 35.34

DISTORTION (%)
IH 25.34

435.83 — — — —
486.13 — — —
546.07 ———
587.56 - - - - - - -
656.27 — — — —

SPHERICAL
ABERRATION (dp)
FNO 230.342

ASTIGMATISM (dp)
IH 15.56

CHROMATIC ABERRATION
OF MAGNIFICATION (a)
IH 15.56

DISTORTION (%)
IH 15.56

435.83 — — — —
486.13 — — —
546.07 ———
587.56 - - - - - - -
656.27 — — — —

SPHERICAL
ABERRATION (dp)
FNO 206.652

ASTIGMATISM (dp)
IH 9.43

CHROMATIC ABERRATION
OF MAGNIFICATION (a)
IH 9.43

DISTORTION (%)
IH 9.43

435.83 — — — —
486.13 — — —
546.07 ———
587.56 - - - - - - -
656.27 — — — —

EYEPIECE OPTICAL SYSTEM

BACKGROUND OF THE INVENTION

1. Field of the Invention

This invention relates to an eyepiece optical system used in an imaging device having a finder optical system or in the finder optical system, and in particular, to an eyepiece optical system of a finder suitable for a small-sized and slim-type imaging device.

2. Description of Related Art

Conventional eyepiece optical systems of this type are represented by an optical system that an intermediate-image-side surface of a lens placed immediately behind an intermediate image is configured as a convex surface (refer to, for example, Japanese Patent Kokai No. Hei 11-64744; pp. 1–7, FIGS. 1, 3, 4, and 5), an optical system that a lens placed immediately behind the intermediate image is configured as a negative lens (refer to, for example, Japanese Patent Kokai No. Hei 10–311957; pp. 2–7, FIGS. 1, 3, 4, and 5), a retrofocus-type optical system (refer to, for example, Japanese Patent Kokai No. Hei 7-295034; pp. 1–6, FIGS. 1 and 2), and a path bending-type optical system (refer to, for example, each of Japanese Patent Kokai Nos. Hei 7-5360 and Hei 8-22048; pp. 1–2, FIG. 1).

The eyepiece optical system set forth in each of Kokai Nos. Hei 11-64744 and Hei 10-311957 is constructed with a telephoto-type system which includes, in order from an intermediate imaging plane of a real image formed by an imaging optical system, a positive lens unit and a negative lens unit.

The eyepiece optical system set forth in Kokai No. Hei 7-295034 is such that a negative lens is placed not immediately behind the intermediate image (a finder screen 6) but behind a prism (a pentaprism 5).

The eyepiece optical system disclosed in Kokai No. Hei 7-5360 is merely constructed with a combination of positive lenses (a reflecting member P3 and an eyepiece G4).

The eyepiece optical system disclosed in Kokai No. Hei No. 8-22048 is such that a diopter adjusting optical system (a field lens component 12) placed in the proximity of the intermediate imaging plane has positive power.

SUMMARY OF THE INVENTION

The eyepiece optical system according to the present invention is interposed between the positions of an intermediate image and a pupil in a finder and comprises, in order from the intermediate-image side, a first lens unit having a negative lens located at the most intermediate-image-side position and a second lens unit including a path-bending optical member and having positive power as a whole, satisfying the following condition:

$$-20 < sf1 < 0 \quad (1)$$

where sf1 is the shaping factor of the negative lens and is expressed as $(r11+r12)/(r11-r12)$, where r11 is the radius of curvature of the intermediate-image-side surface of the negative lens and r12 is the radius of curvature of the pupil-side surface of the negative lens.

This and other features and advantages of the present invention will become apparent from the following detailed description of the preferred embodiments when taken in conjunction with the accompanying drawings.

BRIEF DESCRIPTION OF THE DRAWINGS

FIGS. 4A, 4B, 4C, and 4D are diagrams showing aberration characteristics at −1 dp in the first embodiment;

FIGS. 7A, 7B, and 7C are sectional views showing lens arrangements, developed along the optical axis, at −1 dp, −3 dp, and +1 dp, respectively, of the eyepiece optical system used in a finder optical system for single-lens reflex cameras according to a third embodiment in the present invention;

FIGS. 8A, 8B, 8C, and 8D are diagrams showing aberration characteristics at −1 dp in the third embodiment;

FIGS. 9A, 9B, and 9C are sectional views showing lens arrangements, developed along the optical axis, at −1 dp, −3 dp, and +1 dp, respectively, of the eyepiece optical system used in a finder optical system for single-lens reflex cameras according to a fourth embodiment in the present invention;

FIGS. 11A, 11B, 11C, and 11D are diagrams showing aberration characteristics at −1 dp in the fifth embodiment;

FIGS. 12A, 12B, and 12C are sectional views showing lens arrangements, developed along the optical axis, at −1 dp, −3 dp, and +1 dp, respectively, of the eyepiece optical system used in a finder optical system for single-lens reflex cameras according to a sixth embodiment in the present invention;

FIGS. 13A, 13B, 13C, and 13D are diagrams showing aberration characteristics at −1 dp in the sixth embodiment;

FIGS. 15A, 15B, 15C, and 15D are diagrams showing aberration characteristics at the wide-angle position in the seventh embodiment;

FIGS. 16A, 16B, 16C, and 16D are diagrams showing aberration characteristics at the middle position in the seventh embodiment;

FIGS. 17A, 17B, 17C, and 17D are diagrams showing aberration characteristics at the telephoto position in the seventh embodiment;

FIGS. 19A, 19B, 19C, and 19D are diagrams showing aberration characteristics at the wide-angle position in the eighth embodiment;

FIGS. 20A, 20B, 20C, and 20D are diagrams showing aberration characteristics at the middle position in the eighth embodiment;

FIGS. 21A, 21B, 21C, and 21D are diagrams showing aberration characteristics at the telephoto position in the eighth embodiment;

FIGS. 26A, 26B, and 26C are sectional views showing lens arrangements, developed along the optical axis, at wide-angle, middle, and telephoto positions, respectively, of a real image mode finder optical system using the eyepiece optical system according to a tenth embodiment in the present invention;

FIGS. 27A, 27B, 27C, and 27D are diagrams showing aberration characteristics at the wide-angle position in the tenth embodiment;

FIGS. 28A, 28B, 28C, and 28D are diagrams showing aberration characteristics at the middle position in the tenth embodiment;

FIGS. 29A, 29B, 29C, and 29D are diagrams showing aberration characteristics at the telephoto position in the tenth embodiment;

FIGS. 31A, 31B, and 31C are sectional views showing lens arrangements, developed along the optical axis, at wide-angle, middle, and telephoto positions, respectively, of a real image mode finder optical system using the eyepiece optical system according to a twelfth embodiment in the present invention;

DETAILED DESCRIPTION OF THE PREFERRED EMBODIMENTS

Figure 1:
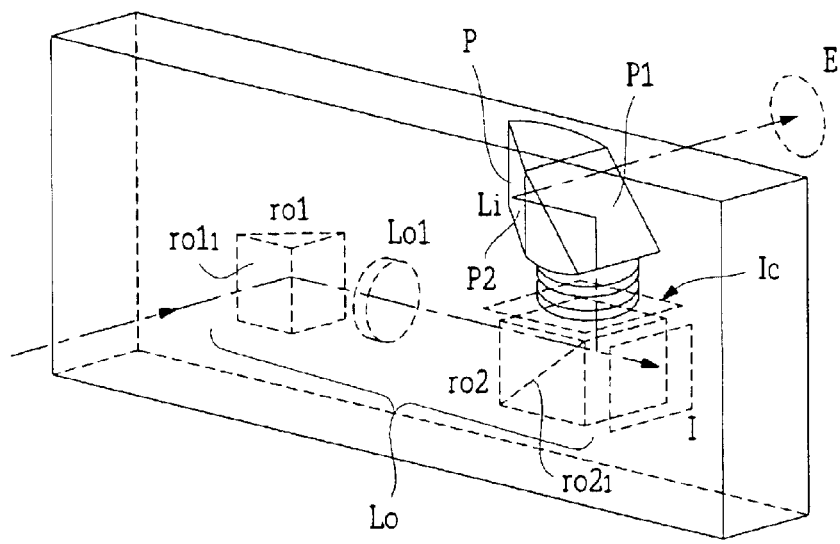
FIG. 1 is an explanatory view showing schematically a single-lens reflex finder optical system using the eyepiece optical system of the present invention.

Before undertaking the description of the embodiments, the function and effect of the present invention will be explained.

In the eyepiece optical system of the present invention, a negative lens is placed immediately behind the intermediate image and thereby a retrofocus type is developed as the whole of the eyepiece optical system.

In doing so, even when the focal length of the imaging optical system is reduced to design a compact finder optical system, the focal length of the eyepiece optical system can be reduced with an eye relief maintained, a finder magnification is not lowered, and easiness of view can be ensured.

Furthermore, since the focal length of the retrofocus-type optical system is short, the intermediate image can be made small with the same field angle, and as a result, the construction of a compact finder device becomes feasible.

Condition (1) determines the shape of the negative lens. By satisfying Condition (1), the production of aberration is minimized, and an increase in the number of lenses for correcting aberration and oversizing involved therein can be obviated.

If the upper limit of Condition (1) is exceeded, the power of the pupil-side surface of the negative lens will be increased and coma produced on the pupil-side surface become considerable, which is unfavorable.

Below the lower limit of Condition (1), the power of the intermediate-image-side surface of the negative lens becomes strong, and the amount of production of aberration, notably astigmatism, of off-axis light on the intermediate-image-side surface is increased. This is unfavorable.

It is more desirable to satisfy the following condition:

$$-12 < sf1 < 0 \tag{1'}$$

It is further desirable to satisfy the following condition:

$$-5 < sf1 < 0 \tag{1''}$$

By satisfying Conditions (1') and (1''), the production of aberration becomes less.

In the eyepiece optical system of the present invention, it is desirable to satisfy the following condition:

$$0.1 < fe/le < 1 \tag{2}$$

where $fe$ is the focal length of the eyepiece optical system and $le$ is the eye relief of the eyepiece optical system.

Condition (2) represents the ratio of the focal length to the eye relief in the eyepiece optical system and defines the effective diameter of the last surface of the eyepiece optical system. A field angle is governed by the size of the intermediate image and the focal length, and by setting the eye relief with respect to the field angle, the effective diameter of the last surface of the eyepiece optical system is determined.

By satisfying Condition (2), a small effective diameter can be obtained together with a sufficient field angle, and thus a compact finder device is feasible.

Beyond the upper limit of Condition (2), the focal length is increased, and when the intermediate image is made small for compactness, the sufficient field angle cannot be ensured. Moreover, the eye relief is short, which is unfavorable.

Below the lower limit of Condition (2), the focal length is reduced, and even when the intermediate image is small, the sufficient field angle can be ensured. However, since the eye relief is long, the effective diameter of the most pupil-side lens of the eyepiece optical system is increased and compactness cannot be achieved.

It is more desirable to satisfy the following condition:

$$0.5 < fe/le < 1 \quad (2')$$

It is further desirable to satisfy the following condition:

$$0.7 < fe/le < 1 \quad (2'')$$

By satisfying Conditions (2') and (2"), the power required for the eyepiece optical system is not increased. This is favorable for correction for aberration.

In the eyepiece optical system of the present invention, it is desirable that at least one of lenses constituting the first lens unit is a diopter adjusting optical system moved along the optical axis for diopter adjustment and satisfies the following condition:

$$0.1 < |pd/pe| < 0.7 \quad (3)$$

where pd is the power of the diopter adjusting optical system and pe is the power of the whole of the eyepiece optical system.

When the diopter adjusting optical system is placed immediately behind the intermediate image, there is no need to place any lens behind the last surface of a prism, and a thickness suitable for the finder device can be held.

Here, Condition (3) defines the power of the diopter adjusting optical system. By satisfying Condition (3), when the diopter adjusting optical system has positive power, a power balance is held by the diopter adjusting optical system and another optical system, and thereby aberration can be easily corrected. When the diopter adjusting optical system has negative power, it is placed on the intermediate-image side, and thereby the retrofocus type can be realized. By doing so, correction for coma and compactness are compatible with each other.

Beyond the upper limit of Condition (3), the power is concentrated in the diopter adjusting optical system when it has the positive power, and therefore the fluctuation of aberration, notably coma, produced in the diopter adjustment becomes heavy, which is unfavorable. When the diopter adjusting optical system has the negative power, the positive power is concentrated in the optical system other than the diopter adjusting optical system because it is necessary to reduce the focal length of the eyepiece optical system in order to achieve compactness. Consequently, coma that cannot be completely corrected with a small number of lenses is considerably produced.

Below the lower limit of Condition (3), the amount of lens movement required for the diopter adjustment is increased because the power of the diopter adjusting optical system is weak, irrespective of the fact that the power is positive or negative, and the eyepiece optical system becomes bulky, which is unfavorable.

It is more desirable to satisfy the following condition:

$$0.1 < |pd/pe| < 0.5 \quad (3')$$

It is further desirable to satisfy the following condition:

$$0.1 < |pd/pe| < 0.3 \quad (3'')$$

By satisfying Conditions (3') and (3"), the power of the eyepiece optical system is lessened and the fluctuation of aberration, notably coma, produced in the diopter adjustment can be favorably suppressed.

In the eyepiece optical system of the present invention, it is desirable that a second lens from the intermediate image has positive power.

When the second lens from the intermediate image is constructed with the positive lens, correction for aberration produced by the negative lens closest to the intermediate image is facilitated.

If the second lens from the intermediate image has negative power, both the most intermediate-image-side lens and the second lens from the intermediate image will have the negative power, and thus the height of an off-axis ray of light is increased so that compactness cannot be achieved. Even though less power lenses are used for the most intermediate-image-side lens and the second lens from the intermediate image so that the height of the off-axis ray is not increased, the production of aberrations, notably spherical aberration and coma, becomes considerable compared with the case where the second lens is the positive lens.

In the eyepiece optical system of the present invention, it is desirable to satisfy the following condition:

$$0 < sf2 < 20 \quad (4)$$

where sf2 is the shaping factor of the second lens from the intermediate image and is expressed as (r21+r22)/(r21−r22), where r21 is the radius of curvature of the intermediate-image-side surface of the second lens from the intermediate image and r22 is the radius of curvature of the pupil-side surface of the second lens from the intermediate image.

Condition (4) defines the shape of the second positive lens from the intermediate image. When the second positive lens from the intermediate image satisfies Condition (4), the production of off-axis aberrations, notably astigmatism and coma, can be lessened.

Beyond the upper limit of Condition (4), the second lens from the intermediate image assumes the shape of a positive meniscus lens, the power of its pupil-side surface is increased, and astigmatism and coma, produced by an increase in the height of the off-axis chief ray, become considerable.

Below the lower limit of Condition (4), the second lens from the intermediate image assumes the shape of a positive lens, the power of the intermediate-image-side surface becomes higher than that of the pupil-side surface, and aberration produced by the increase of the height of the off-axis chief ray is increased. Moreover, when the difference of the radius of curvature between the intermediate-image-side surface of the second lens and the pupil-side surface of the most intermediate-image-side lens is increased, astigmatism is considerably produced on the intermediate-image-side surface of the second lens from the intermediate image.

It is more desirable to satisfy the following condition:

$$0 < sf2 < 15 \quad (4')$$

It is further desirable to satisfy the following condition:

$$0 < sf2 < 3 \quad (4'')$$

By satisfying Conditions (4') and (4"), the amount of production of aberration is further reduced, which is favorable.

In the eyepiece optical system of the present invention, it is desirable that the first lens unit includes the most intermediate-image-side lens and the second lens from the intermediate image, which constitute the diopter adjusting optical system moved along the optical axis for diopter adjustment.

When the diopter adjusting optical system is designed to include lenses with negative and positive power at the same time, it becomes possible to minimize the fluctuation of aberration.

In the eyepiece optical system of the present invention, it is desirable that the most intermediate-image-side lens and the second lens from the intermediate image are cemented to each other and are constructed as a cemented doublet.

When these lenses are constructed as the cemented doublet, the assembly of the optical system is facilitated, and additionally since the off-axis chief ray is of considerable height, chromatic aberration of magnification can be completely suppressed.

In the eyepiece optical system of the present invention, it is desirable that the second lens from the intermediate image has a diffraction surface on the pupil side.

In the present invention, the negative lens and the positive lens arranged in this order from the intermediate image. Consequently, there is a tendency that the diameter of a light beam is large on the pupil-side surface of the second lens from the intermediate image and the angle of incidence of the chief ray becomes small. Thus, a reduction in diffraction efficiency can be obviated in design, and the pupil-side surface is suitable for a diffraction optical element. Furthermore, because the off-axis chief ray is of considerable height at the pupil-side surface of the second lens from the intermediate image, chromatic aberration of magnification can be completely suppressed by the weak power of the diffraction surface.

In the eyepiece optical system of the present invention, it is desirable that the optical path in the eyepiece optical system is bent twice.

When a path-bending-type optical system is used for an objective optical system, the number of reflections in the eyepiece optical system is lessened, and hence the optical path length of the eyepiece optical system can be reduced. As a result, the focal length can be reduced and compactness can be achieved while ensuring a sufficient field angle and a finder magnification.

In this case, when the number of times of path bending in the eyepiece optical system is lessened, the optical path length required for the optical system becomes short and the focal length of the eyepiece optical system can be reduced. Consequently, a sufficient field angle can be ensured and a compacter finder is feasible.

However, if the reflection is only once, at least three reflections will be required for the imaging optical system or the objective optical system which forms the intermediate image. Whereby, the optical path length is increased and thus the focal length is also increased. This brings about oversizing of the entire device, which is unfavorable.

In the real image mode finder optical system using the eyepiece optical system of the present invention, it is desirable to satisfy the following condition:

$$6 < le/ch < 10 \tag{5}$$

where ch is the height of the intermediate image.

Condition (5) defines the ratio of the eye relief to the size of the intermediate image to provide an optimum, small-sized real image mode finder.

By satisfying Condition (5), the height of the intermediate image is kept to a minimum while holding the eye relief, and thus a small-sized real image mode finder which is easy for view can be realized.

Beyond the upper limit of Condition (5), the intermediate image becomes smaller and the eye relief is increased, so that it is necessary to materially reduce the focal length of the eyepiece optical system. However, the diameter of the human pupil is almost constant, and when the focal length is short, a large-aperture lens becomes necessary, which is unfavorable. Moreover, in order to ensure good performance with an extremely short focal length, the number of lenses must be increased, with the result that compactness cannot be achieved.

Below the lower limit of Condition (5), the intermediate image is enlarged with respect to the eye relief, and the eyepiece optical system becomes bulky. In addition, NA is increased and a large amount of light is required for the eyepiece optical system, which is unfavorable.

It is more desirable to satisfy the following condition:

$$6 < le/ch < 9 \tag{5'}$$

It is further desirable to satisfy the following condition:

$$6 < le/ch < 7.7 \tag{5''}$$

By satisfying Conditions (5') and (5''), the power required for the eyepiece optical system is increased, but the amount of production of aberration is lessened, so that aberration can be corrected with a small number of lenses.

The real image mode finder optical system using the eyepiece optical system of the present invention has the objective optical system forming the intermediate image and the eyepiece optical system of the present invention so that the most intermediate-image-side lens of the objective optical system has positive power.

When the positive lens is placed at the most intermediate-image-side position of the objective optical system, the height of the intermediate image is kept to a minimum and the ray height of the eyepiece optical system can also be kept to a minimum. Therefore, a smaller-sized finder optical system is feasible.

In a real image mode variable magnification finder optical system using the eyepiece optical system of the present invention, it is desirable to include a first lens unit with negative power, having at least one reflecting surface, and a second lens unit with positive power, moved to change the magnification, so that the last lens unit at the most intermediate-image-side position has positive power and a single reflecting surface.

In order to make a slim-design finder feasible, it is desirable to constitute a path-bending type and reduce the effective diameter. Thus, it is desirable to impart negative power to the most object-side lens unit and particularly keep the off-axis ray height to a minimum at the wide-angle position. Since the power of the first lens unit is negative, the power of the second lens unit should preferably be positive in order to correct aberration. Moreover, the last lens unit located at the most image-side position has positive power, and thereby the height of the intermediate image and the ray height in the eyepiece optical system can be kept to a minimum. Hence, a smaller finder optical system is feasible.

It is desirable that the finder optical system of the present invention is a TTL finder optical system for observing the real image of an object formed through the objective optical system which is used as a photographing optical system, and satisfies the following condition:

$$0.5 \text{ mm} < ch < 2.6 \text{ mm} \tag{6}$$

By satisfying Condition (6), a slim- and compact-design finder is feasible.

Beyond the upper limit of Condition (6), the diameter of the optical system is increased and thus the slim design cannot be achieved.

Below the lower limit of Condition (6), the NA is increased and a large amount of light is required for the optical system, which is unfavorable.

The above individual conditions and arrangements are properly combined, and thereby a more favorable finder optical system can be constructed.

In each of the conditions, only the upper limit or the lower limit may be replaced with the upper limit or the lower limit corresponding to a more favorable condition. A value corresponding to a condition set forth in each of the embodiments to be described later may also be used as the upper limit or the lower limit.

Also, when an imaging device provided with such a finder optical system is constructed, a slimmer- and compacter-design imaging device is feasible.

In accordance with the drawings, the embodiments of the present invention will be explained below.

The single-lens reflex finder optical system shown in FIG. 1 is such that a light beam incident on an imaging optical system Lo also used as an objective optical system, after being reflected by a reflecting surface $ro1_1$ of an optical member ro1, passes through an optical system Lo1 and is divided, through a path splitting surface $ro2_1$ of a light dividing means ro2, into two beams directed toward an intermediate imaging plane Ic and an imaging plane I, where the beams are imaged. The beam imaged at the intermediate imaging plane Ic passes through an eyepiece optical system Li which has two reflecting surfaces, and reaches a pupil E.

Figure 2:
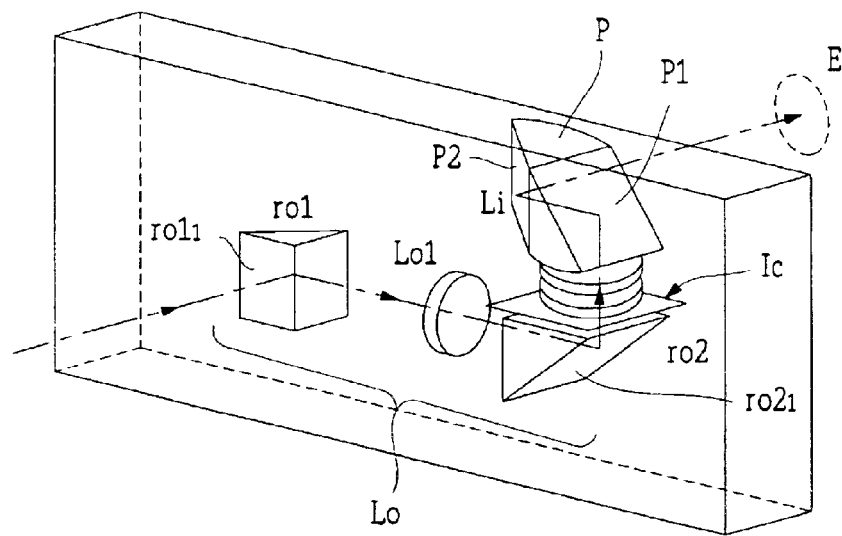
FIG. 2 is an explanatory view showing schematically an real image mode optical system using the eyepiece optical system of the present invention.

The real image mode finder optical system shown in FIG. 2 is such that a light beam incident on the imaging optical system Lo, after being reflected by the reflecting surface $ro1_1$ of the optical member ro1, passes through the optical system Lo1 and is imaged at the intermediate imaging plane Ic by the reflecting surface $ro2_1$ of the optical member ro2. The light beam imaged at the intermediate imaging plane Ic passes through the eyepiece optical system Li which has two reflecting surfaces, and reaches the pupil E.

The eyepiece optical system of the present invention is applicable to the finder optical system of the type of either FIG. 1 or 2. Each of the embodiments to be described below is explained as the eyepiece optical system applied to the finder optical system of such a type.

As a design technique of an optical system including a diffraction optical element (DOE) in each embodiment, an ultra-high-index method is used. Specifically, when the thickness is 0 and the wavelength is 587.56 nm, it is assumed that a virtual refractive index is 1001 and a surface coming in contact with the diffraction surface where the thickness is 0 is the basic shape of the ODE. In the actual fabrication, a phase change is found from the difference between the curvature of the diffraction surface and the shape of a substrate and the refractive index, and this phase change is converted into the pitch of a grating to form the grating on the surface of the substrate.

First Embodiment

Figure 3A:
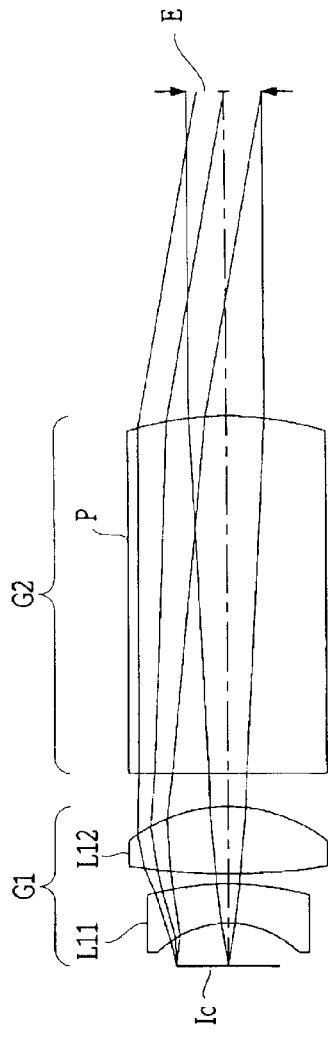
FIGS. 3A, 3B, and 3C are sectional viewss showing lens arrangements, developed along the optical axis, at −1 dp (diopter), −3 dp, and +1 dp, respectively, of the eyepiece optical system used in a finder optical system for single-lens reflex cameras according to a first embodiment in the present invention.
Figure 3B:
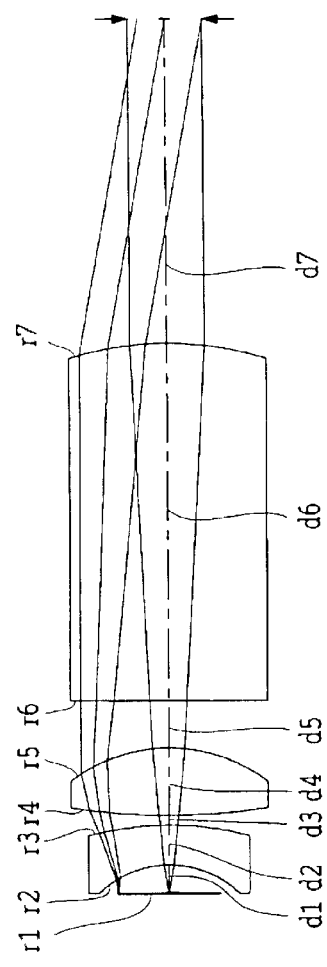
Figure 3C:
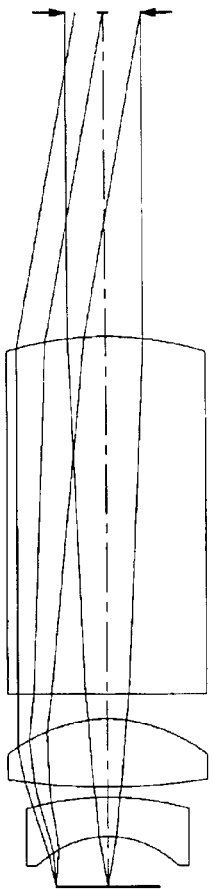

FIGS. 3A–3C show lens arrangements of the eyepiece optical system used in the finder optical system for single-lens reflex cameras according to the first embodiment in the present invention. FIGS. 4A–4D show aberration characteristics in the first embodiment. Also, reference symbol IH represents the height of an image.

The eyepiece optical system of this embodiment, as shown in FIG. 3A, is interposed between the intermediate image Ic and the pupil E and comprises, in order from the intermediate-image side, a first lens unit G1 and a second lens unit G2.

The first lens unit G1 includes, in order from the intermediate-image side, a negative meniscus lens L11 with a concave surface directed toward the intermediate-image side and a biconvex positive lens L12, and has positive power as a whole.

The negative meniscus lens L11 and the biconvex positive lens L12 constitute a diopter adjusting optical system moved along the optical axis for diopter adjustment.

The second lens unit G2 is constructed with a path-bending prism P and has positive power as a whole.

The path-bending prism P has two reflecting surfaces P1 and P2 such as those shown in FIG. 1 so that the optical path in the eyepiece optical system Li is bent twice.

Subsequently, numerical data of optical members constituting the eyepiece optical system of the first embodiment are shown below. In the numerical data of the first embodiment, $r_1$, $r_2$, . . . denote radii of curvature of surfaces of individual lenses and a prism; $d_1$, $d_2$, . . . denote thicknesses of individual lenses and the prism or air spacings between them; $n_{d1}$, $n_{d2}$, . . . denote refractive indices of individual lenses and the prism at the d line; $\nu_{d1}$, $\nu_{d2}$, . . . denote Abbe's numbers of individual lenses and the prism.

Also, when Z is taken as the coordinate in the direction of the optical axis, y is taken as the coordinate normal to the optical axis, K represents a conic constant, and $A_4$, $A_6$, $A_8$, and $A_{10}$ represent aspherical coefficients, the configuration of an aspherical surface is expressed by the following equation:

$$Z=(y^2/r)/[1+\{1-(1+K)\cdot(y/r)^2\}^{1/2}]+A_4 y^4+A_6 y^6+A_8 y^8+A_{10} y^{10}$$

These symbols are also used for the numerical data of other embodiments to be described later.

Numerical Data 1

| | | | |
|---|---|---|---|
| $r_1 = \infty$ (intermediate imaging plane) | $d_1 = D1$ | | |
| $r_2 = -8.5423$ (aspherical surface) | $d_2 = 2.1536$ | $n_{d2} = 1.58874$ | $\nu_{d2} = 30.49$ |
| $r_3 = -13.4846$ | $d_3 = 0.5259$ | | |
| $r_4 = 38.4850$ | $d_4 = 3.4437$ | $n_{d4} = 1.49445$ | $\nu_{d4} = 57.66$ |
| $r_5 = -7.5450$ | $d_5 = D5$ | | |
| $r_6 = 203.3223$ (aspherical surface) | $d_6 = 18.5223$ | $n_{d6} = 1.49445$ | $\nu_{d6} = 57.66$ |
| $r_7 = -13.2403$ (aspherical surface) | $d_7 = 16.5893$ | | |

| Variable spacings | | | |
|---|---|---|---|
| D1 | 1.9550 | 1.3692 | 2.4278 |
| D5 | 1.5645 | 2.2296 | 1.0958 |
| Diopter | −1 | −3 | 1 |

Aspherical coefficients

Figure 5A:
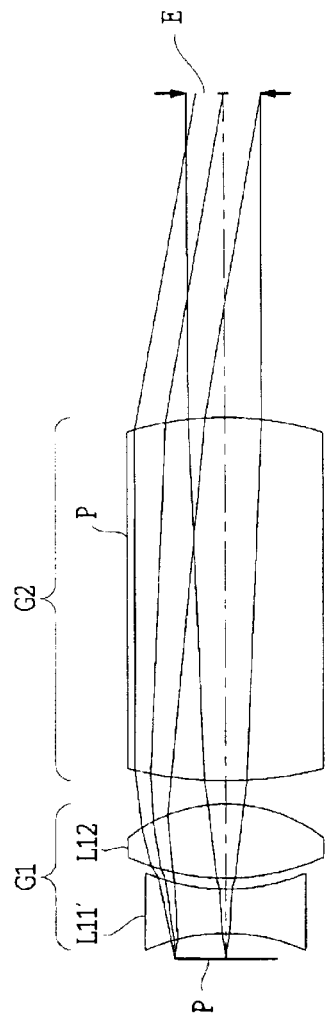
FIGS. 5A, 5B, and 5C are sectional views showing lens arrangements, developed along the optical axis, at −1 dp, −3 dp, and +1 dp, respectively, of the eyepiece optical system used in a finder optical system for single-lens reflex cameras according to a second embodiment in the present invention.
Figure 5B:
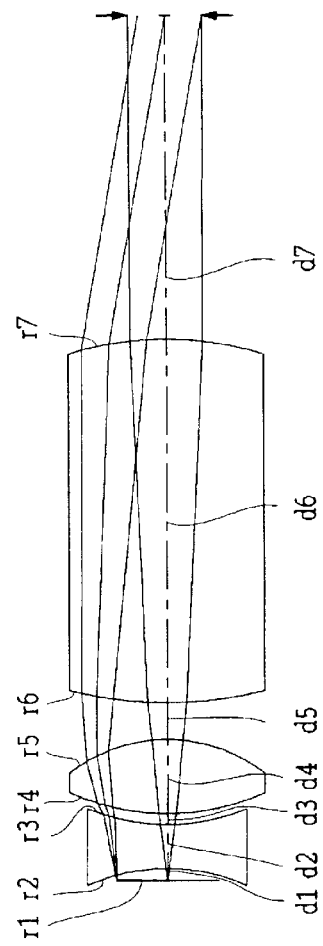
Figure 5C:
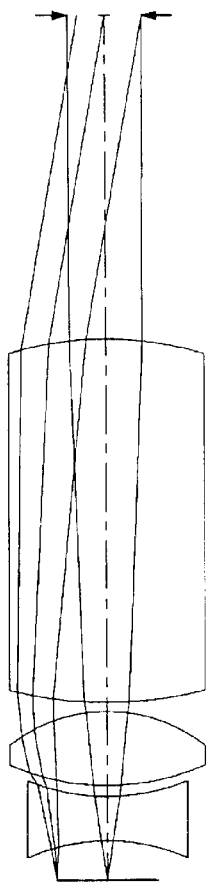
Figure 6A:
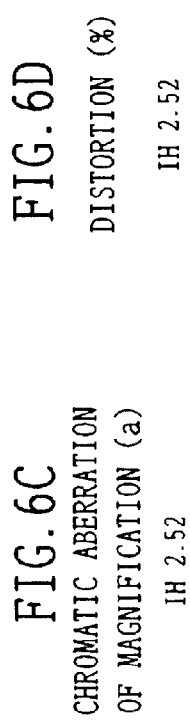
FIGS. 6A, 6B, 6C, and 6D are diagrams showing aberration characteristics at −1 dp in the second embodiment.
Figure 6B:
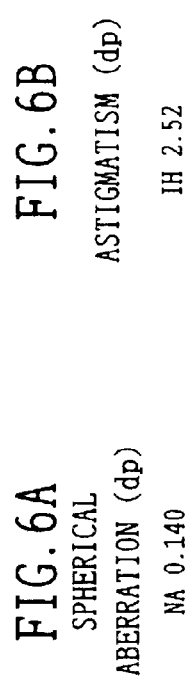
Figure 6C:
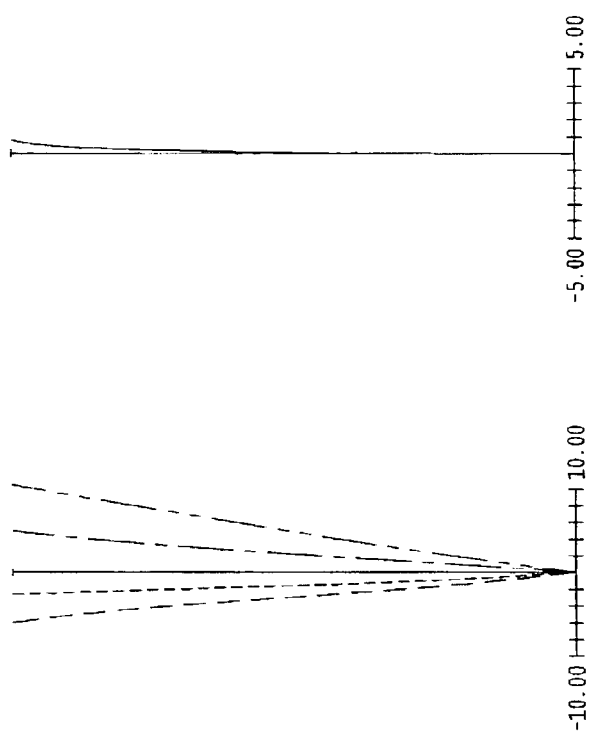
Figure 6D:
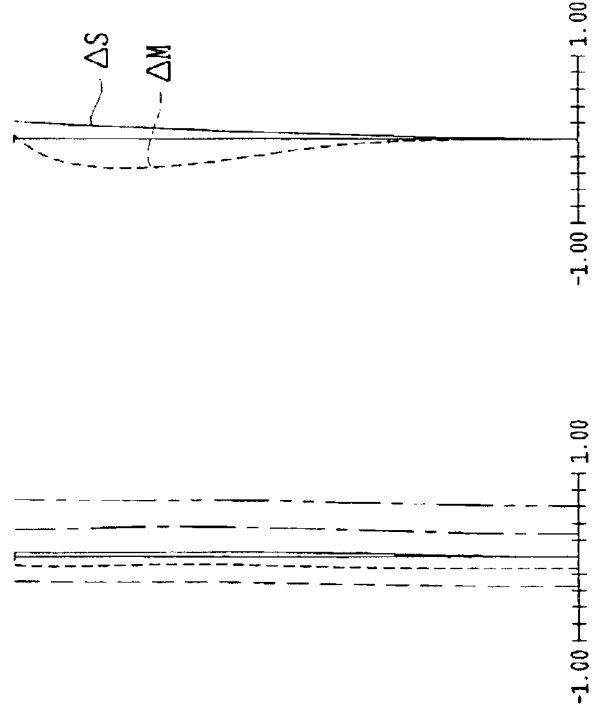

Second surface $K = 0$
$A_4 = -4.31460 \times 10^{-3}$   $A_6 = 0$
$A_8 = 0$   $A_{10} = 0$ Sixth surface $K = 0$
$A_4 = 1.36750 \times 10^{-4}$   $A_6 = -8.69960 \times 10^{-6}$
$A_8 = 0$   $A_{10} = 0$ Seventh surface $K = 0$
$A_4 = 2.74860 \times 10^{-5}$   $A_6 = 1.91620 \times 10^{-6}$
$A_8 = -1.19150 \times 10^{-7}$   $A_{10} = 1.91330 \times 10^{-9}$ Second Embodiment FIGS. 5A–5C show lens arrangements of the eyepiece optical system used in the finder optical system for single-lens reflex cameras according to the second embodiment in the present invention. FIGS. 6A–6D show aberration characteristics in the second embodiment.

The eyepiece optical system of this embodiment, as shown in FIG. 5A, is interposed between the intermediate image Ic and the pupil E and comprises, in order from the intermediate-image side, the first lens unit G1 and the second lens unit G2.

The first lens unit G1 includes, in order from the intermediate-image side, a biconcave negative lens L11' and the biconvex positive lens L12, and has positive power as a whole.

The biconcave negative lens L11' and the biconvex positive lens L12 constitute the diopter adjusting optical system moved along the optical axis for diopter adjustment.

The second lens unit G2 is constructed with the path-bending prism P and has positive power as a whole.

The path-bending prism P has two reflecting surfaces P1 and P2 such as those shown in FIG. 1 so that the optical path in the eyepiece optical system Li is bent twice.

Subsequently, numerical data of optical members constituting the eyepiece optical system of the second embodiment are shown below.

Numerical Data 2

$r_1 = \infty$ (intermediate imaging plane)    $d_1 = D1$
$r_2 = -9.5054$    $d_2 = 2.2855$    $n_{d2} = 1.58874$    $v_{d2} = 30.49$
$r_3 = 11.0742$    $d_3 = 0.5000$
$r_4 = 11.5186$ (aspherical surface)    $d_4 = 3.6958$    $n_{d4} = 1.49445$    $v_{d4} = 57.66$
$r_5 = -8.1241$    $d_5 = D5$
$r_6 = 23.3824$ (aspherical surface)    $d_6 = 18.5000$    $n_{d6} = 1.49445$    $v_{d6} = 57.66$
$r_7 = -12.7566$ (aspherical surface)    $d_7 = 16.5000$

| Variable spacings | | | |
|---|---|---|---|
| D1 | 1.3400 | 0.5000 | 2.1364 |
| D5 | 1.2965 | 2.1365 | 0.5000 |
| Diopter | -1 | -3 | 1 |

Aspherical coefficients

Fourth surface $K = 0$
$A_4 = -4.25190 \times 10^{-4}$    $A_6 = 9.10710 \times 10^{-6}$
$A_8 = 0$    $A_{10} = 0$ Sixth surface $K = 0$
$A_4 = -8.32670 \times 10^{-5}$    $A_6 = 2.33690 \times 10^{-6}$
$A_8 = 0$    $A_{10} = 0$ Seventh surface $K = 0$
$A_4 = 2.42730 \times 10^{-5}$    $A_6 = 4.54470 \times 10^{-6}$
$A_8 = -2.11400 \times 10^{-7}$    $A_{10} = 4.38260 \times 10^{-9}$ Third Embodiment FIGS. 7A–7C show lens arrangements of the eyepiece optical system used in the finder optical system for single-lens reflex cameras according to the third embodiment in the present invention. FIGS. 8A–8D show aberration characteristics in the third embodiment.

The eyepiece optical system of this embodiment, as shown in FIG. 7A, is interposed between the intermediate image Ic and the pupil E and comprises, in order from the intermediate-image side, the first lens unit G1 and the second lens unit G2.

The first lens unit G1 is constructed with a cemented doublet of the biconcave negative lens L11' and the biconvex positive lens L12, arranged in this order from the intermediate-image side, and has positive power as a whole.

The cemented doublet of the biconcave negative lens L11' and the biconvex positive lens L12 constitutes the diopter adjusting optical system moved along the optical axis for diopter adjustment.

The second lens unit G2 is constructed with the path-bending prism P and has positive power as a whole.

The path-bending prism P has two reflecting surfaces P1 and P2 such as those shown in FIG. 1 so that the optical path in the eyepiece optical system Li is bent twice.

Subsequently, numerical data of optical members constituting the eyepiece optical system of the third embodiment are shown below.

Numerical Data 3

$r_1 = \infty$ (intermediate imaging plane)    $d_1 = D1$
$r_2 = -11.4494$    $d_2 = 2.0000$    $n_{d2} = 1.58874$    $v_{d2} = 30.49$
$r_3 = 40.4910$    $d_3 = 3.0000$    $n_{d3} = 1.49445$    $v_{d3} = 57.66$
$r_4 = -9.4145$    $d_4 = D4$
$r_5 = 14.0645$ (aspherical surface)    $d_5 = 18.5000$    $n_{d5} = 1.49445$    $v_{d5} = 57.66$
$r_6 = -12.6189$ (aspherical surface)    $d_6 = 16.5000$

| Variable spacings | | | |
|---|---|---|---|
| D1 | 2.0846 | 0.8002 | 3.2518 |
| D4 | 1.6673 | 2.9517 | 0.5000 |
| Diopter | -1 | -3 | 1 |

Aspherical coefficients

Fifth surface $K = 0$
$A_4 = -2.52230 \times 10^{-4}$    $A_6 = 3.44360 \times 10^{-6}$
$A_8 = 0$    $A_{10} = 0$ Sixth surface $K = 0$
$A_4 = 8.79970 \times 10^{-5}$    $A_6 = -5.19940 \times 10^{-6}$
$A_8 = 4.10650 \times 10^{-7}$    $A_{10} = -9.27130 \times 10^{-9}$ Fourth Embodiment FIGS. 9A–9C show lens arrangements of the eyepiece optical system used in the finder optical system for single-lens reflex cameras according to the fourth embodiment in the present invention.

The eyepiece optical system of this embodiment, as shown in FIG. 9A, is interposed between the intermediate image Ic and the pupil E and comprises, in order from the intermediate-image side, the first lens unit G1 and the second lens unit G2.

The first lens unit G1 includes, in order from the intermediate-image side, the negative meniscus lens L11 with a concave surface directed toward the intermediate-image side and the biconvex positive lens L12, and has positive power as a whole.

The negative meniscus lens L11 and the biconvex positive lens L12 constitute the diopter adjusting optical system moved along the optical axis for diopter adjustment.

The biconvex positive lens 12 has a diffraction optical surface (here, the DOE surface) on the pupil side.

The second lens unit G2 is constructed with the path-bending prism P and has positive power as a whole.

The path-bending prism P has two reflecting surfaces P1 and P2 such as those shown in FIG. 1 so that the optical path in the eyepiece optical system Li is bent twice.

Subsequently, numerical data of optical members constituting the eyepiece optical system of the fourth embodiment are shown below.

Numerical Data 4

| | | | |
|---|---|---|---|
| $r_1 = \infty$ (intermediate imaging plane) | $d_1 = D1$ | | |
| $r_2 = -8.2372$ (aspherical surface) | $d_2 = 2.6773$ | $n_{d2} = 1.58874$ | $\nu_{d2} = 30.49$ |
| $r_3 = -59.1029$ | $d_3 = 0.5000$ | | |
| $r_4 = 67.1854$ | $d_4 = 2.7281$ | $n_{d4} = 1.49445$ | $\nu_{d4} = 57.66$ |
| $r_5 = -8.5164$ (diffraction optical surface) | $d_5 = 0.0000$ | | |
| $r_6 = -8.5157$ | $d_6 = D6$ | | |
| $r_7 = 41.0757$ (aspherical surface) | $d_7 = 18.5000$ | $n_{d7} = 1.49445$ | $\nu_{d7} = 57.66$ |
| $r_8 = -12.6750$ (aspherical surface) | $d_8 = 16.5000$ | | |

Variable spacings

| | | | |
|---|---|---|---|
| D1 | 1.9143 | 1.1666 | 2.5928 |
| D6 | 1.1889 | 1.9381 | 0.5000 |
| Diopter | −1 | −3 | 1 |

Aspherical coefficients

Figure 10A:
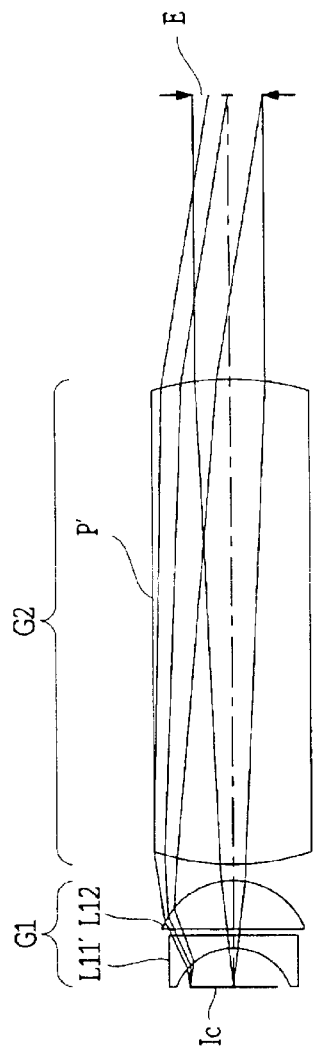
FIGS. 10A, 10B, and 10C are sectional views showing lens arrangements, developed along the optical axis, at −1 dp, −3 dp, and +1 dp, respectively, of the eyepiece optical system used in a finder optical system for single-lens reflex cameras according to a fifth embodiment in the present invention.
Figure 10B:
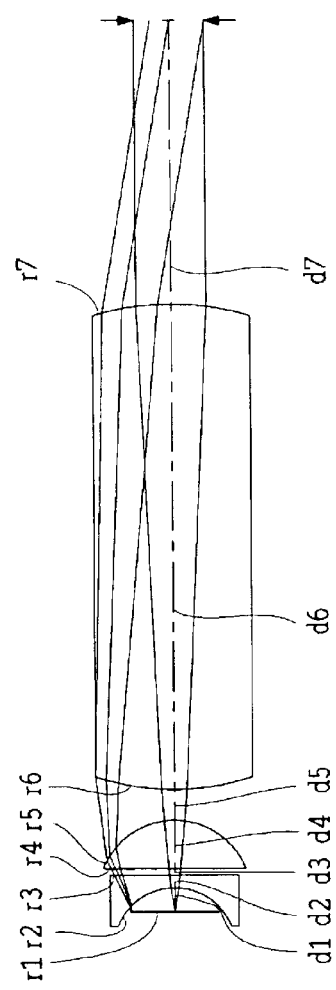
Figure 10C:
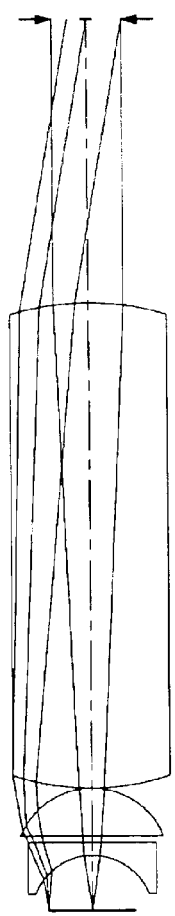

Second surface $K = 0$
$A_4 = -1.96870 \times 10^{-3}$ $A_6 = 0$
$A_8 = 0$ $A_{10} = 0$ Seventh surface $K = 0$
$A_4 = -3.14060 \times 10^{-5}$ $A_6 = -1.68270 \times 10^{-6}$
$A_8 = 0$ $A_{10} = 0$ Eighth surface $K = 0$
$A_4 = 6.80830 \times 10^{-5}$ $A_6 = -2.77390 \times 10^{-6}$
$A_8 = 1.55180 \times 10^{-7}$ $A_{10} = -3.04430 \times 10^{-9}$ Fifth Embodiment FIGS. 10A–10C show lens arrangements of the eyepiece optical system used in the finder optical system for single-lens reflex cameras according to the fifth embodiment in the present invention. FIGS. 11A–11D show aberration characteristics in the fifth embodiment.

The eyepiece optical system of this embodiment, as shown in FIG. 10A, is interposed between the intermediate image Ic and the pupil E and comprises, in order from the intermediate-image side, the first lens unit G1 and the second lens unit G2.

The first lens unit G1 includes, in order from the intermediate-image side, the biconcave negative lens L11' and the biconvex positive lens L12, and has positive power as a whole.

The biconcave negative lens L11' and the biconvex positive lens L12 constitute the diopter adjusting optical system moved along the optical axis for diopter adjustment.

The second lens unit G2 is constructed with a pentagonal roof prism P' and has positive power as a whole.

The pentagonal roof prism P' has two reflecting surfaces (not shown) so that the optical path in the eyepiece optical system Li is bent twice.

Subsequently, numerical data of optical members constituting the eyepiece optical system of the fifth embodiment are shown below.

Numerical Data 5

| | | | |
|---|---|---|---|
| $r_1 = \infty$ (intermediate imaging plane) | $d_1 = D1$ | | |
| $r_2 = -4.5584$ (aspherical surface) | $d_2 = 0.7297$ | $n_{d2} = 1.58874$ | $\nu_{d2} = 30.49$ |
| $r_3 = 118.9739$ | $d_3 = 0.2230$ | | |
| $r_4 = 208.5528$ | $d_4 = 2.8729$ | $n_{d4} = 1.49445$ | $\nu_{d4} = 57.66$ |
| $r_5 = -4.6843$ | $d_5 = D5$ | | |
| $r_6 = 15.3202$ (aspherical surface) | $d_6 = 28.6882$ | $n_{d6} = 1.49445$ | $\nu_{d6} = 57.66$ |
| $r_7 = -16.5717$ (aspherical surface) | $d_7 = 16.5000$ | | |

Variable spacings

| | | | |
|---|---|---|---|
| D1 | 2.3317 | 1.2432 | 3.3271 |
| D5 | 1.0954 | 2.1839 | 0.1000 |
| Diopter | −1 | −3 | 1 |

Aspherical coefficients

Second surface $K = 0$
$A_4 = -3.29210 \times 10^{-3}$ $A_6 = 5.94370 \times 10^{-4}$
$A_8 = -7.26950 \times 10^{-5}$ $A_{10} = -1.36930 \times 10^{-7}$ Sixth surface $K = 0$
$A_4 = -4.99190 \times 10^{-4}$ $A_6 = 2.85960 \times 10^{-5}$
$A_8 = -3.15330 \times 10^{-7}$ $A_{10} = -6.12000 \times 10^{-9}$ Seventh surface $K = 0$
$A_4 = -9.25890 \times 10^{-5}$ $A_6 = 1.57040 \times 10^{-5}$
$A_8 = -6.82090 \times 10^{-7}$ $A_{10} = 9.56500 \times 10^{-9}$ Sixth Embodiment FIGS. 12A–12C show lens arrangements of the eyepiece optical system used in the finder optical system for single-lens reflex cameras according to the sixth embodiment in the present invention. FIGS. 13A–13D show aberration characteristics in the sixth embodiment.

The eyepiece optical system of this embodiment, as shown in FIG. 12A, is interposed between the intermediate image Ic and the pupil E and comprises, in order from the intermediate-image side, the first lens unit G1 and the second lens unit G2.

The first lens unit G1 includes, in order from the intermediate-image side, the biconcave negative lens L11' and the biconvex positive lens L12, and has positive power as a whole.

The biconcave negative lens L11' and the biconvex positive lens L12 constitute the diopter adjusting optical system moved along the optical axis for diopter adjustment.

The second lens unit G2 includes, in order from the intermediate-image side, the path-bending prism P and a positive meniscus lens L21 with a concave surface directed toward the intermediate-image side, and has positive power as a whole.

The path-bending prism P has two reflecting surfaces P1 and P2 such as those shown in FIG. 1 so that the optical path in the eyepiece optical system Li is bent twice.

Subsequently, numerical data of optical members constituting the eyepiece optical system of the sixth embodiment are shown below.

Numerical Data 6

| | | | |
|---|---|---|---|
| $r_1 = \infty$ (intermediate imaging plane) | $d_1 = D1$ | | |
| $r_2 = -6.6244$ (aspherical surface) | $d_2 = 3.0041$ | $n_{d2} = 1.58874$ | $\nu_{d2} = 30.49$ |
| $r_3 = 12.6558$ | $d_3 = 0.2685$ | | |
| $r_4 = 15.3958$ | $d_4 = 2.8139$ | $n_{d4} = 1.49445$ | $\nu_{d4} = 57.66$ |
| $r_5 = -5.9551$ | $d_5 = D5$ | | |
| $r_6 = 32.2603$ (aspherical surface) | $d_6 = 18.9473$ | $n_{d6} = 1.49445$ | $\nu_{d6} = 57.66$ |
| $r_7 = -18.1763$ | $d_7 = 0.1000$ | | |
| $r_8 = -19.5376$ | $d_8 = 0.5460$ | $n_{d8} = 1.49445$ | $\nu_{d8} = 57.66$ |
| $r_9 = -18.1295$ (aspherical surface) | $d_9 = 16.5000$ | | |

| Variable spacings | | | |
|---|---|---|---|
| D1 | 3.5902 | 2.6777 | 4.4664 |
| D5 | 0.9762 | 1.8886 | 0.1000 |
| Diopter | −1 | −3 | 1 |

Aspherical coefficients

Figure 14A:
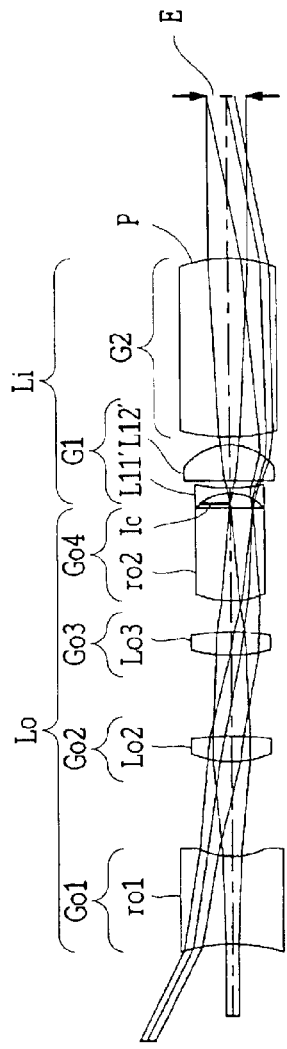
FIGS. 14A, 14B, and 14C are sectional views showing lens arrangements, developed along the optical axis, at wide-angle, middle, and telephoto positions, respectively, of a real image mode finder optical system using the eyepiece optical system according to a seventh embodiment in the present invention.
Figure 14B:
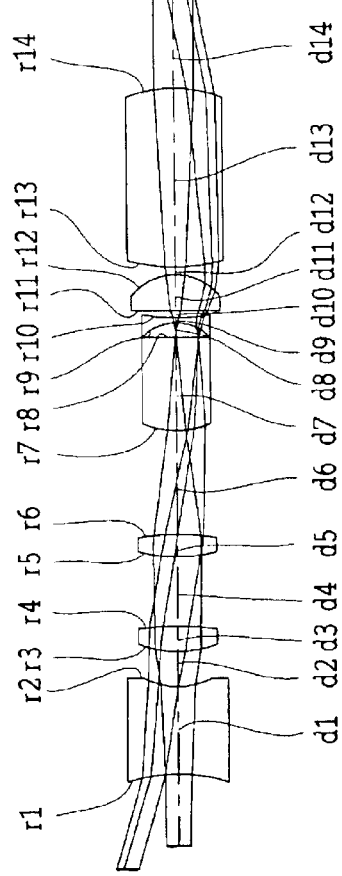
Figure 14C:
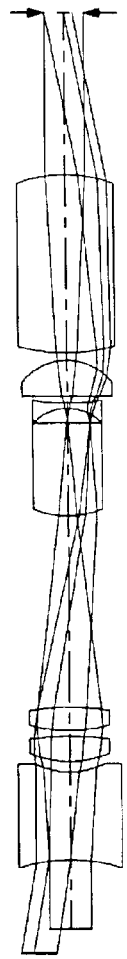

Second surface $K = 0$
$A_4 = 1.26440 \times 10^{-3}$  $A_6 = -2.17030 \times 10^{-4}$
$A_8 = -1.94970 \times 10^{-5}$  $A_{10} = 2.35050 \times 10^{-6}$ Sixth surface $K = 0$
$A_4 = -3.82050 \times 10^{-4}$  $A_6 = 3.57710 \times 10^{-5}$
$A_8 = -9.60280 \times 10^{-7}$  $A_{10} = 5.08950 \times 10^{-9}$ Ninth surface $K = 0$
$A_4 = -6.22440 \times 10^{-5}$  $A_6 = 1.01380 \times 10^{-5}$
$A_8 = -5.57330 \times 10^{-7}$  $A_{10} = 9.54830 \times 10^{-9}$ Seventh Embodiment FIGS. 14A–14C show lens arrangements of the real image mode finder optical system using the eyepiece optical system according to the seventh embodiment in the present invention. FIGS. 15A–15D, 16A–16D, and 17A–17D show aberration characteristics in the seventh embodiment.

The finder optical system of this embodiment, as shown in FIG. 14A, comprises the objective optical system Lo forming the intermediate image and the eyepiece optical system Li.

The objective optical system Lo includes, in order from the object side, a first lens unit Go1, a second lens unit Go2, a third lens unit Go3, and a fourth lens unit Go4.

The first lens unit Go1 is constructed with the optical member ro1 which has the single reflecting surface ro1₁ such as that shown in FIG. 2, and has negative power as a whole.

The second lens unit Go2 is constructed with a biconvex positive lens Lo2. The biconvex positive lens Lo2 can be moved to change the magnification.

The third lens unit Go3 is constructed with a biconvex positive lens Lo3.

The biconvex positive lens Lo2 and the biconvex positive lens Lo3 constitute the optical system Lo1 shown in FIG. 2.

The fourth lens unit Go4 is constructed with the optical member ro2 which has the single reflecting surface ro2₁ such as that shown in FIG. 2. The optical member ro2 has positive power.

The eyepiece optical system Li is interposed between the intermediate image Ic and the pupil E and comprises, in order from the intermediate-image side, the first lens unit G1 and the second lens unit G2.

The first lens unit G1 includes, in order from the intermediate-image side, the biconcave negative lens L11' and a positive meniscus lens L12' with a concave surface directed toward the intermediate-image side, and has positive power as a whole.

The biconcave negative lens L11' and the positive meniscus lens L12' constitute the diopter adjusting optical system moved along the optical axis for diopter adjustment.

The second lens unit G2 is constructed with the path-bending prism P and has positive power as a whole.

The path-bending prism P has two reflecting surfaces P1 and P2 such as those shown in FIG. 2 so that the optical path in the eyepiece optical system Li is bent twice.

Subsequently, numerical data of optical members constituting the eyepiece optical system of the seventh embodiment are shown below.

Numerical Data 7

| | | | |
|---|---|---|---|
| $r_1 = -12.9579$ (aspherical surface) | $d_1 = 9.0590$ | $n_{d1} = 1.58874$ | $\nu_{d1} = 30.49$ |
| $r_2 = 12.4873$ | $d_2 = D2$ | | |
| $r_3 = 9.9200$ (aspherical surface) | $d_3 = 2.5282$ | $n_{d3} = 1.49445$ | $\nu_{d3} = 57.66$ |
| $r_4 = -38.4909$ | $d_4 = D4$ | | |
| $r_5 = 15.2785$ (aspherical surface) | $d_5 = 2.1290$ | $n_{d5} = 1.49445$ | $\nu_{d5} = 57.66$ |
| $r_6 = -34.9287$ | $d_6 = D6$ | | |
| $r_7 = 9.4845$ | $d_7 = 9.8526$ | $n_{d7} = 1.49445$ | $\nu_{d7} = 57.66$ |
| $r_8 = \infty$ (intermediate imaging plane) | $d_8 = D8$ | | |
| $r_9 = -4.3222$ (aspherical surface) | $d_9 = 0.4703$ | $n_{d9} = 1.58874$ | $\nu_{d9} = 30.49$ |
| $r_{10} = 19.6597$ | $d_{10} = 0.7075$ | | |
| $r_{11} = -238.1137$ | $d_{11} = 3.8142$ | $n_{d11} = 1.5277$ | $\nu_{d11} = 55.78$ |
| $r_{12} = -5.4004$ | $d_{12} = D12$ | | |
| $r_{13} = 18.3208$ | $d_{13} = 18.5271$ | $n_{d13} = 1.49445$ | $\nu_{d13} = 57.66$ |
| $r_{14} = -12.1210$ (aspherical surface) | $d_{14} = 16.5000$ | | |

| | Wide-angle | Middle | Telephoto |
|---|---|---|---|
| (Variable spacings-magnification change) | | | |
| D2 | 9.8562 | 3.3421 | 0.6235 |
| D4 | 8.5674 | 7.4454 | 0.8031 |
| D6 | 3.3400 | 10.9762 | 20.3370 |
| (Variable spacings - diopter adjustment) | | | |
| (Diopter at wide-angle position) | | | |
| D8 | 1.5848 | 0.9323 | 2.1976 |
| D12 | 0.7129 | 1.3654 | 0.1000 |
| Diopter | −1.02 | −3.20 | 0.96 |

Aspherical coefficients

Figure 18A:
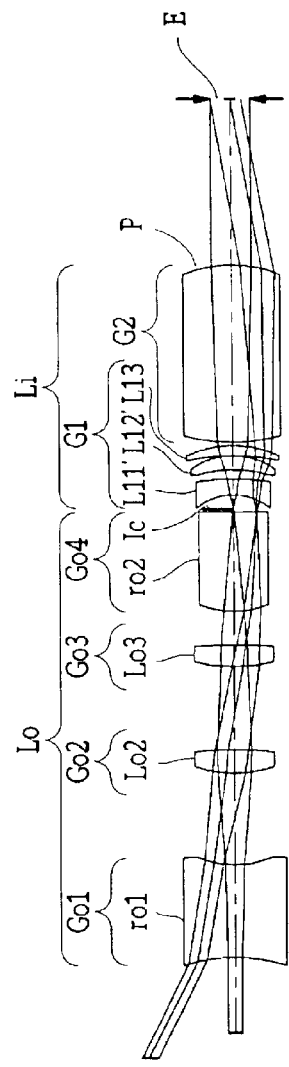
FIGS. 18A, 18B, and 18C are sectional views showing lens arrangements, developed along the optical axis, at wide-angle, middle, and telephoto positions, respectively, of a real image mode finder optical system using the eyepiece optical system according to an eighth embodiment in the present invention.
Figure 18B:
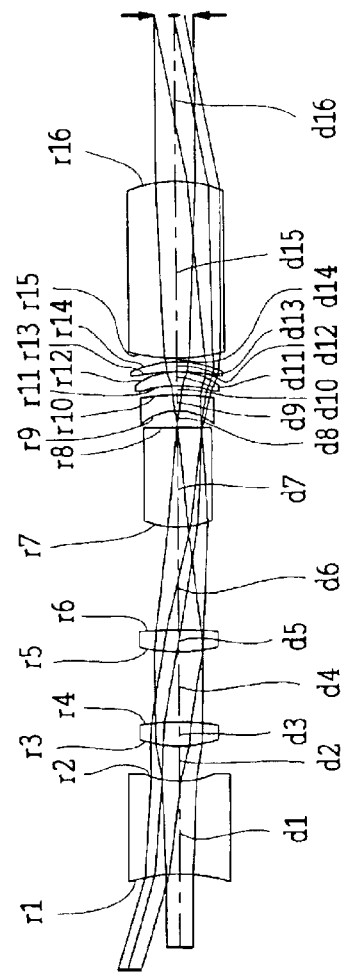
Figure 18C:
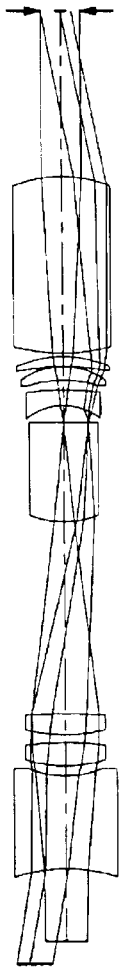

First surface $K = 0$
$A_4 = 3.44610 \times 10^{-4}$  $A_6 = -6.64790 \times 10^{-6}$
$A_8 = 2.21990 \times 10^{-7}$  $A_{10} = -2.76670 \times 10^{-9}$ Third surface $K = 0$
$A_4 = -1.76180 \times 10^{-4}$  $A_6 = 3.04260 \times 10^{-7}$
$A_8 = -6.28570 \times 10^{-8}$  $A_{10} = -1.01460 \times 10^{-9}$ Fifth surface $K = 0$
$A_4 = -1.36620 \times 10^{-4}$  $A_6 = 9.06390 \times 10^{-7}$
$A_8 = -3.07630 \times 10^{-9}$  $A_{10} = 2.08530 \times 10^{-9}$ Ninth surface $K = 0$
$A_4 = 4.34980 \times 10^{-3}$  $A_6 = -6.74330 \times 10^{-4}$
$A_8 = 3.69990 \times 10^{-5}$  $A_{10} = 0$ -continued Fourteenth surface K = 0
$A_4 = 1.81060 \times 10^{-4}$   $A_6 = -7.22120 \times 10^{-6}$
$A_8 = 2.58740 \times 10^{-7}$   $A_{10} = -3.59190 \times 10^{-9}$ Eighth Embodiment FIGS. 18A–18C show lens arrangements of the real image mode finder optical system using the eyepiece optical system according to the eighth embodiment in the present invention. FIGS. 19A–19D, 20A–20D, and 21A–21D show aberration characteristics in the eighth embodiment.

The finder optical system of this embodiment, as shown in FIG. 18A, comprises the objective optical system Lo forming the intermediate image and the eyepiece optical system Li.

The objective optical system Lo includes, in order from the object side, the first lens unit Go1, the second lens unit Go2, the third lens unit Go3, and the fourth lens unit Go4.

The first lens unit Go1 is constructed with the optical member ro1 which has the single reflecting surface ro1$_1$ such as that shown in FIG. 2, and has negative power as a whole.

The second lens unit Go2 is constructed with the biconvex positive lens Lo2. The biconvex positive lens Lo2 can be moved to change the magnification.

The third lens unit Go3 is constructed with the biconvex positive lens Lo3.

The fourth lens unit Go4 is constructed with the optical member ro2 which has the single reflecting surface ro2$_1$ such as that shown in FIG. 2. The optical member ro2 has positive power.

The eyepiece optical system Li is interposed between the intermediate image Ic and the pupil E and comprises, in order from the intermediate-image side, the first lens unit G1 and the second lens unit G2.

The first lens unit G1 includes, in order from the intermediate-image side, the negative meniscus lens L11 with a concave surface directed toward the intermediate-image side, a positive meniscus lens L12' with a concave surface directed toward the intermediate-image side, and a positive meniscus lens L13 with a concave surface directed toward the intermediate-image side, and has positive power as a whole.

The negative meniscus lens L11, the positive meniscus lens L12', and the positive meniscus lens L13 constitute the diopter adjusting optical system moved along the optical axis for diopter adjustment.

The second lens unit G2 is constructed with the path-bending prism P and has positive power as a whole.

The path-bending prism P has two reflecting surfaces P1 and P2 such as those shown in FIG. 2 so that the optical path in the eyepiece optical system Li is bent twice.

Subsequently, numerical data of optical members constituting the eyepiece optical system of the eighth embodiment are shown below.
Numerical Data 8

$r_1 = -11.8731$ (aspherical surface)   $d_1 = 9.3090$   $n_{d1} = 1.58874$   $v_{d1} = 30.49$
$r_2 = 11.2096$   $d_2 = D2$
$r_3 = 8.8281$ (aspherical surface)   $d_3 = 2.6951$   $n_{d3} = 1.49445$   $v_{d3} = 57.66$ -continued $r_4 = -45.4744$   $d_4 = D4$
$r_5 = 15.1004$ (aspherical surface)   $d_5 = 2.0826$   $n_{d5} = 1.49445$   $v_{d5} = 57.66$
$r_6 = -30.6719$   $d_6 = D6$
$r_7 = 11.6224$   $d_7 = 9.8812$   $n_{d7} = 1.49445$   $v_{d7} = 57.66$
$r_8 = \infty$ (intermediate imaging plane)   $d_8 = D8$
$r_9 = -4.3222$ (aspherical surface)   $d_9 = 1.2443$   $n_{d9} = 1.58874$   $v_{d9} = 30.49$
$r_{10} = -47.2543$   $d_{10} = 1.0399$
$r_{11} = -11.9007$   $d_{11} = 1.6170$   $n_{d11} = 1.5277$   $v_{d11} = 55.78$
$r_{12} = -5.7064$   $d_{12} = 0.0498$
$r_{13} = -25.9386$   $d_{13} = 1.0090$   $n_{d13} = 1.58874$   $v_{d13} = 30.49$
$r_{14} = -9.2444$   $d_{14} = D14$
$r_{15} = 48.4278$   $d_{15} = 18.2690$   $n_{d15} = 1.49445$   $v_{d15} = 57.66$
$r_{16} = -11.5815$ (aspherical surface)   $d_{16} = 16.5000$

|  | Wide-angle | Middle | Telephoto |
|---|---|---|---|
|  | (Variable spacings) | | |
| D2 | 9.6351 | 3.4271 | 0.8959 |
| D4 | 8.5423 | 7.2146 | 0.6967 |
| D6 | 3.3935 | 10.9292 | 19.9783 |
|  | (Variable spacings - diopter adjustment) | | |
|  | (Diopter at wide-angle position) | | |
| D8 | 1.7187 | 1.1037 | 2.2560 |
| D14 | 0.6517 | 1.2667 | 0.1145 |
| Diopter | -0.92 | -3.12 | 1.08 |

Aspherical coefficients

First surface

Figure 22A:
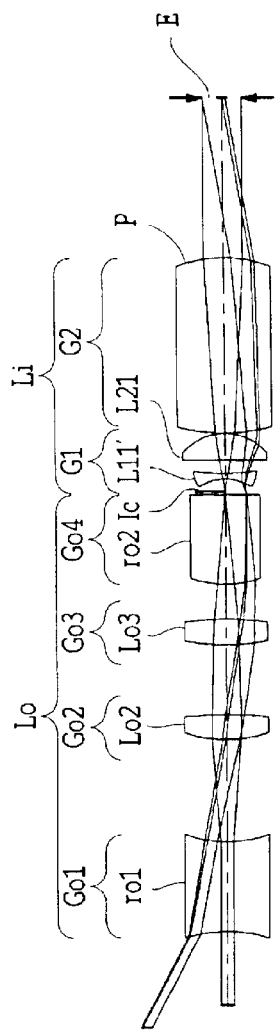
FIGS. 22A, 22B, and 22C are sectional views showing lens arrangements, developed along the optical axis, at wide-angle, middle, and telephoto positions, respectively, of a real image mode finder optical system using the eyepiece optical system according to a ninth embodiment in the present invention.
Figure 22B:
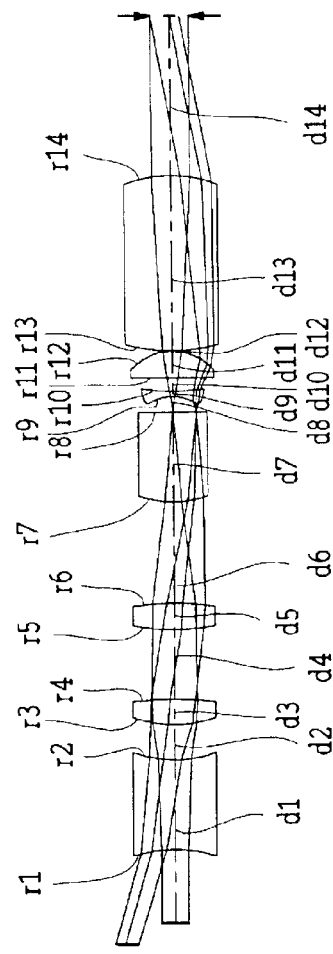
Figure 22C:
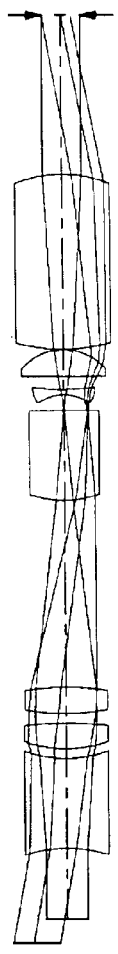
Figure 23A:
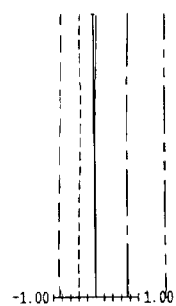
FIGS. 23A, 23B, 23C, and 23D are diagrams showing aberration characteristics at the wide-angle position in the ninth embodiment.
Figure 23B:
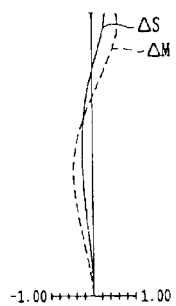
Figure 23C:
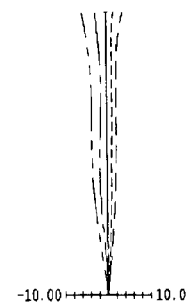
Figure 23D:
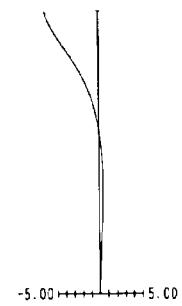
Figure 24A:
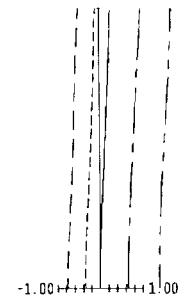
FIGS. 24A, 24B, 24C, and 24D are diagrams showing aberration characteristics at the middle position in the ninth embodiment.
Figure 24B:
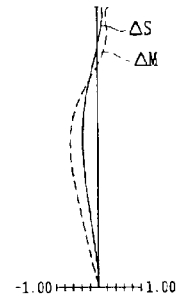
Figure 24C:
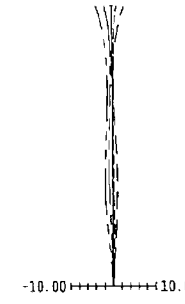
Figure 24D:
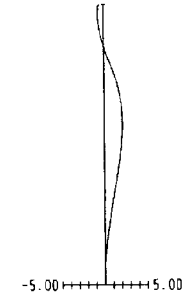
Figure 25A:
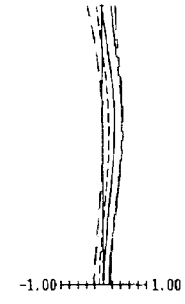
FIGS. 25A, 25B, 25C, and 25D are diagrams showing aberration characteristics at the telephoto position in the ninth embodiment.
Figure 25B:
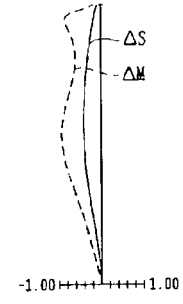
Figure 25C:
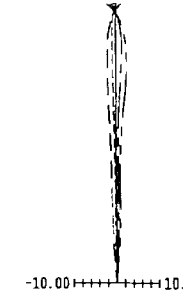
Figure 25D:
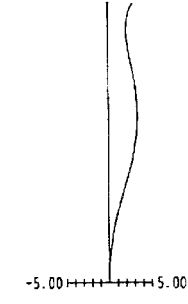

K = 0
$A_4 = 4.60190 \times 10^{-4}$   $A_6 = -1.04050 \times 10^{-5}$
$A_8 = 3.91150 \times 10^{-7}$   $A_{10} = -5.84090 \times 10^{-9}$
Third surface K = 0
$A_4 = -2.58520 \times 10^{-4}$   $A_6 = 2.03860 \times 10^{-6}$
$A_8 = -3.21000 \times 10^{-7}$   $A_{10} = 7.54250 \times 10^{-9}$
Fifth surface K = 0
$A_4 = -1.84920 \times 10^{-4}$   $A_6 = 1.59200 \times 10^{-6}$
$A_8 = 2.30240 \times 10^{-7}$   $A_{10} = -8.27110 \times 10^{-9}$
Ninth surface K = 0
$A_4 = 4.34980 \times 10^{-3}$   $A_6 = -6.74330 \times 10^{-4}$
$A_8 = 3.69990 \times 10^{-5}$   $A_{10} = 0$
Sixteenth surface K = 0
$A_4 = 1.36730 \times 10^{-4}$   $A_6 = -6.42460 \times 10^{-6}$
$A_8 = 2.55920 \times 10^{-7}$   $A_{10} = -3.66040 \times 10^{-9}$ Ninth Embodiment FIGS. 22A–22C show lens arrangements of the real image mode finder optical system using the eyepiece optical system according to the ninth embodiment in the present invention. FIGS. 23A–23D, 24A–24D, and 25A–25D show aberration characteristics in the ninth embodiment.

The finder optical system of this embodiment, as shown in FIG. 22A, comprises the objective optical system Lo forming the intermediate image and the eyepiece optical system Li.

The objective optical system Lo includes, in order from the object side, the first lens unit Go1, the second lens unit Go2, the third lens unit Go3, and the fourth lens unit Go4.

The first lens unit Go1 is constructed with the optical member ro1 which has the single reflecting surface ro1$_1$ such as that shown in FIG. 2, and has negative power as a whole.

The second lens unit Go2 is constructed with the biconvex positive lens Lo2. The biconvex positive lens Lo2 can be moved to change the magnification.

The third lens unit Go3 is constructed with the biconvex positive lens Lo3.

The fourth lens unit Go4 is constructed with the optical member ro2 which has the single reflecting surface $ro2_1$ such as that shown in FIG. 2. The optical member ro2 has positive power.

The eyepiece optical system Li is interposed between the intermediate image Ic and the pupil E and comprises, in order from the intermediate-image side, the first lens unit G1 and the second lens unit G2.

The first lens unit G1 is constructed with the biconcave negative lens L11'.

The biconcave negative lens L11' constitutes the diopter adjusting optical system moved along the optical axis for diopter adjustment.

The second lens unit G2 includes, in order from the intermediate-image side, the positive meniscus lens L21 with a concave surface directed toward the intermediate-image side and the path-bending prism P, and has positive power as a whole.

The path-bending prism P has two reflecting surfaces P1 and P2 such as those shown in FIG. 2 so that the optical path in the eyepiece optical system Li is bent twice.

Subsequently, numerical data of optical members constituting the eyepiece optical system of the ninth embodiment are shown below.

Numerical Data 9

| | | | |
|---|---|---|---|
| $r_1$ = −14.7840 (aspherical surface) | $d_1$ = 9.2142 | $n_{d1}$ = 1.58874 | $v_{d1}$ = 30.49 |
| $r_2$ = 11.8978 | $d_2$ = D2 | | |
| $r_3$ = 10.2640 (aspherical surface) | $d_3$ = 2.7930 | $n_{d3}$ = 1.49445 | $v_{d3}$ = 57.66 |
| $r_4$ = −46.8190 | $d_4$ = D4 | | |
| $r_5$ = 13.7327 (aspherical surface) | $d_5$ = 2.8792 | $n_{d5}$ = 1.49445 | $v_{d5}$ = 57.66 |
| $r_6$ = −41.5372 | $d_6$ = D6 | | |
| $r_7$ = 10.0578 | $d_7$ = 9.7320 | $n_{d7}$ = 1.49445 | $v_{d7}$ = 57.66 |
| $r_8$ = ∞ (intermediate imaging plane) | $d_8$ = D8 | | |
| $r_9$ = −3.4341 (aspherical surface) | $d_9$ = 0.4518 | $n_{d9}$ = 1.58874 | $v_{d9}$ = 30.49 |
| $r_{10}$ = 10.3540 (aspherical surface) | $d_{10}$ = D10 | | |
| $r_{11}$ = −43.2117 | $d_{11}$ = 2.7888 | $n_{d11}$ = 1.5277 | $v_{d11}$ = 55.78 |
| $r_{12}$ = −5.1504 (aspherical surface) | $d_{12}$ = 0.1140 | | |
| $r_{13}$ = 15.5442 | $d_{13}$ = 18.3201 | $n_{d13}$ = 1.49445 | $v_{d13}$ = 57.66 |
| $r_{14}$ = −11.8910 (aspherical surface) | $d_{14}$ = 16.5000 | | |

| | Wide-angle | Middle | Telephoto |
|---|---|---|---|
| (Variable spacings) | | | |
| D2 | 10.8587 | 4.0211 | 1.0227 |
| D4 | 7.0838 | 6.9233 | 0.9267 |
| D6 | 3.5703 | 10.5684 | 19.5635 |
| (Variable spacings - diopter adjustment) | | | |
| (diopter at wide-angle position) | | | |
| D8 | 1.6595 | 1.8915 | 1.4553 |
| D10 | 1.4644 | 1.2323 | 1.6686 |
| Diopter | −1.04 | −2.05 | −0.19 |

Aspherical coefficients

First surface $K = 0$
$A_4 = 2.59860 \times 10^{-4}$   $A_6 = 1.65670 \times 10^{-7}$
$A_8 = -1.13590 \times 10^{-7}$   $A_{10} = 2.25340 \times 10^{-9}$ Third surface $K = 0$
$A_4 = -1.60840 \times 10^{-4}$   $A_6 = -1.68880 \times 10^{-6}$
$A_8 = 2.77090 \times 10^{-7}$   $A_{10} = -6.56080 \times 10^{-9}$ Fifth surface $K = 0$
$A_4 = -6.53500 \times 10^{-5}$   $A_6 = -5.56940 \times 10^{-6}$
$A_8 = 1.78330 \times 10^{-7}$   $A_{10} = -3.26010 \times 10^{-9}$ Ninth surface $K = 0$
$A_4 = 3.08960 \times 10^{-2}$   $A_6 = -6.94250 \times 10^{-3}$
$A_8 = 5.78380 \times 10^{-4}$   $A_{10} = 0$ Tenth surface $K = 0$
$A_4 = -3.74300 \times 10^{-3}$   $A_6 = 6.72680 \times 10^{-6}$
$A_8 = 2.29740 \times 10^{-5}$   $A_{10} = 0$ Twelfth surface $K = 0$
$A_4 = 1.54470 \times 10^{-3}$   $A_6 = -7.21740 \times 10^{-5}$
$A_8 = 3.29920 \times 10^{-6}$   $A_{10} = 0$ Fourteenth surface $K = 0$
$A_4 = 3.04230 \times 10^{-5}$   $A_6 = -1.28440 \times 10^{-8}$
$A_8 = 5.26710 \times 10^{-8}$   $A_{10} = -9.68140 \times 10^{-10}$ Tenth Embodiment FIGS. 26A–26C show lens arrangements of the real image mode finder optical system using the eyepiece optical system according to the tenth embodiment in the present invention. FIGS. 27A–27D, 28A–28D, and 29A–29D show aberration characteristics in the tenth embodiment.

The finder optical system of this embodiment, as shown in FIG. 26A, comprises the objective optical system Lo forming the intermediate image and the eyepiece optical system Li.

The objective optical system Lo includes, in order from the object side, the first lens unit Go1, the second lens unit Go2, the third lens unit Go3, and the fourth lens unit Go4.

The first lens unit Go1 is constructed with the optical member ro1 which has the single reflecting surface $ro1_1$ such as that shown in FIG. 2, and has negative power as a whole.

The second lens unit Go2 includes a positive meniscus lens Lo2' with a convex surface directed toward the object side. The positive meniscus lens Lo2' can be moved to change the magnification.

The third lens unit Go3 is constructed with the biconvex positive lens Lo3.

The fourth lens unit Go4 is constructed with the optical member ro2 which has the single reflecting surface $ro2_1$ such as that shown in FIG. 2. The optical member ro2 has positive power.

The eyepiece optical system Li is interposed between the intermediate image Ic and the pupil E and comprises, in order from the intermediate-image side, the first lens unit G1 and the second lens unit G2.

The first lens unit G1 includes a cemented doublet of the negative meniscus lens L11 with a concave surface directed toward the intermediate-image side and the positive meniscus lens L12' with a concave surface directed toward the intermediate-image side, arranged in this order from the intermediate-image side, and has positive power as a whole.

The cemented doublet of the negative meniscus lens L11 and the positive meniscus lens L12' constitutes the diopter adjusting optical system moved along the optical axis for diopter adjustment.

The second lens unit G2 is constructed with the path-bending prism P, and has positive power as a whole.

The path-bending prism P has two reflecting surfaces P1 and P2 such as those shown in FIG. 2 so that the optical path in the eyepiece optical system Li is bent twice.

Subsequently, numerical data of optical members constituting the eyepiece optical system of the tenth embodiment are shown below.

Numerical Data 10

| | | | |
|---|---|---|---|
| $r_1 = -14.8865$ (aspherical surface) | $d_1 = 9.1930$ | $n_{d1} = 1.58874$ | $v_{d1} = 30.49$ |
| $r_2 = 9.0409$ | $d_2 = D2$ | | |
| $r_3 = 7.5195$ (aspherical surface) | $d_3 = 3.1119$ | $n_{d3} = 1.49445$ | $v_{d3} = 57.66$ |
| $r_4 = 363.0017$ | $d_4 = D4$ | | |
| $r_5 = 14.8997$ (aspherical surface) | $d_5 = 2.6700$ | $n_{d5} = 1.49445$ | $v_{d5} = 57.66$ |
| $r_6 = -20.7949$ | $d_6 = D6$ | | |
| $r_7 = 12.2367$ | $d_7 = 10.1384$ | $n_{d7} = 1.49445$ | $v_{d7} = 57.66$ |
| $r_8 = \infty$ (intermediate imaging plane) | $d_8 = D8$ | | |
| $r_9 = -5.0161$ (aspherical surface) | $d_9 = 1.7788$ | $n_{d9} = 1.58874$ | $v_{d9} = 30.49$ |
| $r_{10} = -6.1463$ | $d_{10} = 3.1607$ | $n_{d10} = 1.49445$ | $v_{d10} = 57.66$ |
| $r_{11} = -5.2503$ | $d_{11} = D11$ | | |
| $r_{12} = 56.1137$ (aspherical surface) | $d_{12} = 18.5000$ | $n_{d12} = 1.49445$ | $v_{d12} = 57.66$ |
| $r_{13} = -12.0270$ (aspherical surface) | $d_{13} = 16.5000$ | | |

| | Wide-angle | Middle | Telephoto |
|---|---|---|---|
| (Variable spacings) | | | |
| D2 | 9.2370 | 3.1613 | 1.0459 |
| D4 | 8.3130 | 6.8960 | 0.6281 |
| D6 | 2.8483 | 10.3410 | 18.7243 |
| (Variable spacings - diopter adjustment) | | | |
| (diopter at wide-angle position) | | | |
| D8 | 2.4388 | 1.7213 | 3.0412 |
| D11 | 0.9078 | 1.6253 | 0.3054 |
| Diopter | −1.00 | −3.19 | 0.99 |

Aspherical coefficients

Figure 30A:
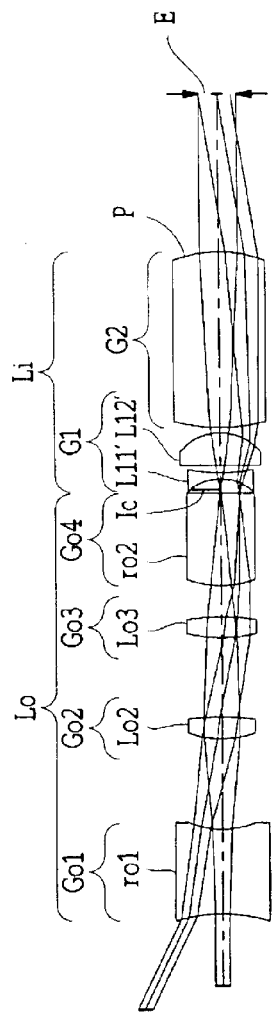
FIGS. 30A, 30B, and 30C are sectional views showing lens arrangements, developed along the optical axis, at wide-angle, middle, and telephoto positions, respectively, of a real image mode finder optical system using the eyepiece optical system according to an eleventh embodiment in the present invention.
Figure 30B:
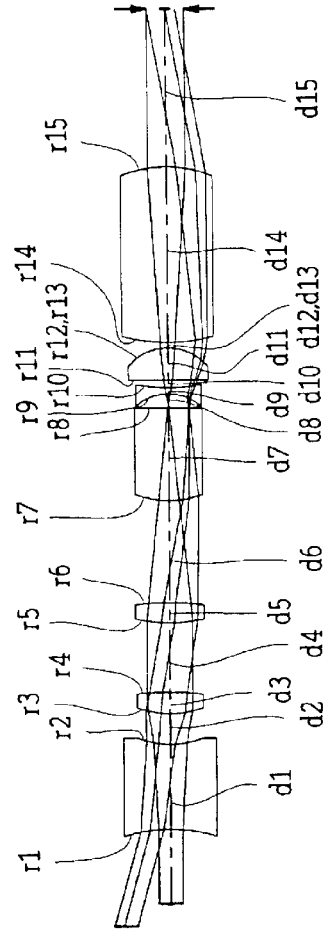
Figure 30C:
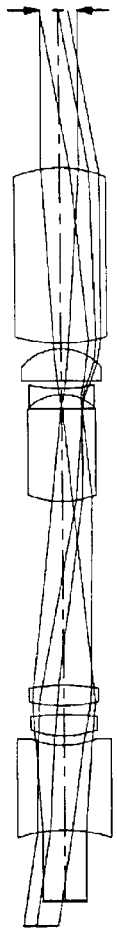
Figure 32A:
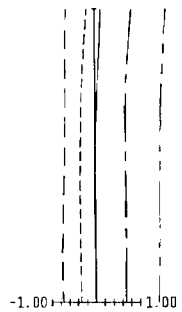
FIGS. 32A, 32B, 32C, and 32D are diagrams showing aberration characteristics at the wide-angle position in the twelfth embodiment.
Figure 32B:
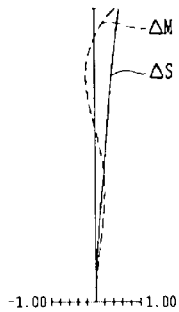
Figure 32C:
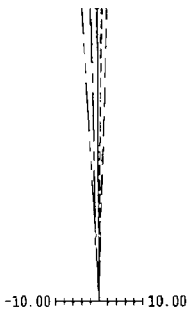
Figure 32D:
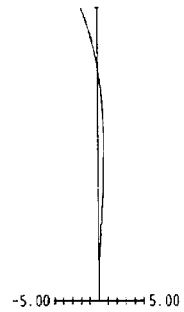
Figure 33A:
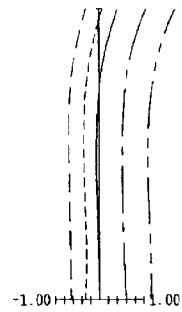
FIGS. 33A, 33B, 33C, and 33D are diagrams showing aberration characteristics at the middle position in the twelfth embodiment.
Figure 33B:
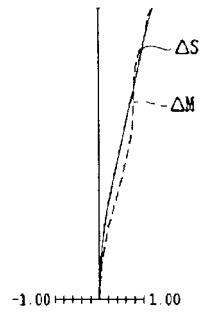
Figure 33C:
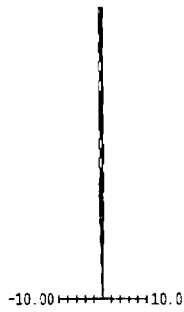
Figure 33D:
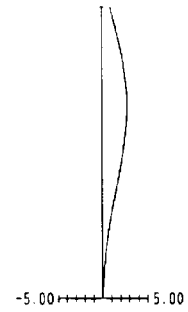
Figure 34A:
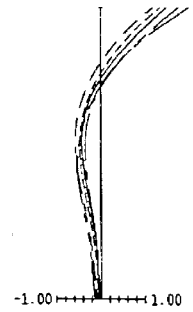
FIGS. 34A, 34B, 34C, and 34D are diagrams showing aberration characteristics at the telephoto position in the twelfth embodiment.
Figure 34B:
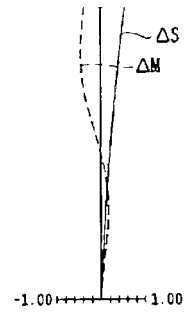
Figure 34C:
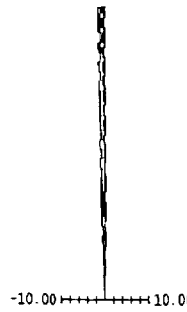
Figure 34D:
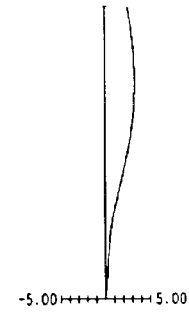

First surface $K = 0$
$A_4 = 4.40610 \times 10^{-4}$    $A_6 = -4.68250 \times 10^{-6}$
$A_8 = 6.64490 \times 10^{-8}$    $A_{10} = -5.56310 \times 10^{-10}$ Third surface $K = 0$
$A_4 = -3.29510 \times 10^{-4}$    $A_6 = -3.20230 \times 10^{-6}$
$A_8 = -1.79760 \times 10^{-7}$    $A_{10} = 3.30060 \times 10^{-9}$ Fifth surface $K = 0$
$A_4 = -3.02020 \times 10^{-4}$    $A_6 = 8.17060 \times 10^{-6}$
$A_8 = -4.97730 \times 10^{-8}$    $A_{10} = -1.92020 \times 10^{-9}$ Ninth surface $K = 0$
$A_4 = 3.66900 \times 10^{-3}$    $A_6 = -2.77340 \times 10^{-4}$
$A_8 = -1.01510 \times 10^{-5}$    $A_{10} = 0$ Twelfth surface $K = 0$
$A_4 = -1.15870 \times 10^{-3}$    $A_6 = 4.31820 \times 10^{-5}$
$A_8 = -7.19790 \times 10^{-7}$    $A_{10} = 0$ Thirteenth surface $K = 0$
$A_4 = -8.40050 \times 10^{-5}$    $A_6 = 8.92480 \times 10^{-6}$
$A_8 = -3.25570 \times 10^{-7}$    $A_{10} = 4.26530 \times 10^{-9}$ Eleventh Embodiment FIGS. 30A–30C show lens arrangements of the real image mode finder optical system using the eyepiece optical system according to the eleventh embodiment in the present invention.

The finder optical system of this embodiment, as shown in FIG. 30A, comprises the objective optical system Lo forming the intermediate image and the eyepiece optical system Li.

The objective optical system Lo includes, in order from the object side, the first lens unit Go1, the second lens unit Go2, the third lens unit Go3, and the fourth lens unit Go4.

The first lens unit Go1 is constructed with the optical member ro1 which has the single reflecting surface ro1$_1$ such as that shown in FIG. 2, and has negative power as a whole.

The second lens unit Go2 is constructed with the biconvex positive lens Lo2. The biconvex positive lens Lo2 can be moved to change the magnification.

The third lens unit Go3 is constructed with the biconvex positive lens Lo3.

The fourth lens unit Go4 is constructed with the optical member ro2 which has the single reflecting surface ro2$_1$ such as that shown in FIG. 2. The optical member ro2 has positive power.

The eyepiece optical system Li is interposed between the intermediate image Ic and the pupil E and comprises, in order from the intermediate-image side, the first lens unit G1 and the second lens unit G2.

The first lens unit G1 includes, in order from the intermediate-image side, the biconcave negative lens L11' and the positive meniscus lens L12' with a concave surface directed toward the intermediate-image side, and has positive power as a whole.

The biconcave negative lens L11' and the positive meniscus lens L12' constitute the diopter adjusting optical system moved along the optical axis for diopter adjustment.

The positive meniscus lens L12' has the diffraction optical surface (here, the DOE surface) on the pupil side.

The second lens unit G2 is constructed with the path-bending prism P and has positive power as a whole.

The path-bending prism P has two reflecting surfaces P1 and P2 such as those shown in FIG. 2 so that the optical path in the eyepiece optical system Li is bent twice.

Subsequently, numerical data of optical members constituting the eyepiece optical system of the eleventh embodiment are shown below.

Numerical Data 11

| | | | |
|---|---|---|---|
| $r_1 = -13.2616$ (aspherical surface) | $d_1 = 9.1719$ | $n_{d1} = 1.58874$ | $v_{d1} = 30.49$ |
| $r_2 = 11.5886$ | $d_2 = D2$ | | |
| $r_3 = 10.0134$ (aspherical surface) | $d_3 = 2.5661$ | $n_{d3} = 1.49445$ | $v_{d3} = 57.66$ |
| $r_4 = -38.4091$ | $d_4 = D4$ | | |
| $r_5 = 14.0576$ (aspherical surface) | $d_5 = 2.1122$ | $n_{d5} = 1.49445$ | $v_{d5} = 57.66$ |
| $r_6 = -34.8192$ | $d_6 = D6$ | | |
| $r_7 = 10.0797$ | $d_7 = 9.8375$ | $n_{d7} = 1.49445$ | $v_{d7} = 57.66$ |
| $r_8 = \infty$ (intermediate imaging surface) | $d_8 = D8$ | | |
| $r_9 = -4.3222$ (aspherical surface) | $d_9 = 0.5152$ | $n_{d9} = 1.58874$ | $v_{d9} = 30.49$ |
| $r_{10} = 17.1179$ | $d_{10} = 0.7587$ | | |
| $r_{11} = -199.0184$ | $d_{11} = 3.7199$ | $n_{d11} = 1.5277$ | $v_{d11} = 55.78$ |
| $r_{12} = -5.4775$ (diffraction optical surface) | $d_{12} = 0.0000$ | | |
| $r_{13} = -5.4774$ | $d_{13} = D13$ | | |
| $r_{14} = 20.8932$ | $d_{14} = 18.7841$ | $n_{d14} = 1.49445$ | $v_{d14} = 57.66$ |
| $r_{15} = -11.5523$ (aspherical surface) | $d_{15} = 16.5000$ | | |

| | Wide-angle | Middle | Telephoto |
|---|---|---|---|
| (Variable spacings) | | | |
| D2 | 9.6085 | 3.2142 | 0.6962 |
| D4 | 8.4248 | 7.3601 | 0.8433 |
| D6 | 3.5565 | 11.0155 | 20.0503 |
| (Variable spacings - diopter adjustment) (diopter at wide-angle position) | | | |
| D8 | 1.4931 | 0.8918 | 1.9527 |
| D13 | 0.5596 | 1.1610 | 0.1000 |
| Diopter | −0.84 | −2.76 | −0.57 |

Aspherical coefficients

First surface $K = 0$
$A_4 = 3.04930 \times 10^{-4}$    $A_6 = -3.33330 \times 10^{-6}$
$A_8 = 1.05850 \times 10^{-7}$    $A_{10} = -1.67140 \times 10^{-9}$ Third surface $K = 0$
$A_4 = -1.29400 \times 10^{-4}$    $A_6 = -9.84610 \times 10^{-6}$
$A_8 = 1.05960 \times 10^{-6}$    $A_{10} = -3.87340 \times 10^{-8}$ Fifth surface $K = 0$
$A_4 = -8.42150 \times 10^{-5}$    $A_6 = -5.00880 \times 10^{-7}$
$A_8 = -5.05310 \times 10^{-7}$    $A_{10} = 3.02190 \times 10^{-8}$ Ninth surface $K = 0$
$A_4 = 4.34980 \times 10^{-3}$    $A_6 = -6.74330 \times 10^{-4}$
$A_8 = 3.69990 \times 10^{-5}$    $A_{10} = 0$ Fifteenth surface $K = 0$
$A_4 = 1.94740 \times 10^{-4}$    $A_6 = -1.00200 \times 10^{-5}$
$A_8 = 3.80690 \times 10^{-7}$    $A_{10} = -5.19590 \times 10^{-9}$ Twelfth Embodiment FIGS. 31A–31C show lens arrangements of the real image mode finder optical system using the eyepiece optical system according to the twelfth embodiment in the present invention. FIGS. 32A–32D, 33A–33D, and 34A–34D show aberration characteristics in the twelfth embodiment.

The finder optical system of this embodiment, as shown in FIG. 31A, comprises the objective optical system Lo forming the intermediate image and the eyepiece optical system Li.

The objective optical system Lo includes, in order from the object side, the first lens unit Go1, the second lens unit Go2, the third lens unit Go3, and the fourth lens unit Go4.

The first lens unit Go1 is constructed with the optical member ro1 which has the single reflecting surface ro1$_1$ such as that shown in FIG. 2, and has negative power as a whole.

The second lens unit Go2 is constructed with the biconvex positive lens Lo2. The biconvex positive lens Lo2 can be moved to change the magnification.

The third lens unit Go3 is constructed with the biconvex positive lens Lo3.

The fourth lens unit Go4 is constructed with the optical member ro2 which has the single reflecting surface ro2$_1$ such as that shown in FIG. 2. The optical member ro2 has positive power.

The eyepiece optical system Li is interposed between the intermediate image Ic and the pupil E and comprises, in order from the intermediate-image side, the first lens unit G1 and the second lens unit G2.

The first lens unit G1 includes, in order from the intermediate-image side, the negative meniscus lens L11 with a concave surface directed toward the intermediate-image side, a positive meniscus lens L12' with a concave surface directed toward the intermediate-image side, and a negative meniscus lens L13' with a concave surface directed toward the intermediate-image side, and has positive power as a whole.

The negative meniscus lens L11, the positive meniscus lens L12', and the negative meniscus lens L13' constitute the diopter adjusting optical system moved along the optical axis for diopter adjustment.

The second lens unit G2 is constructed with the path-bending prism P and has positive power as a whole.

The path-bending prism P has two reflecting surfaces P1 and P2 such as those shown in FIG. 2 so that the optical path in the eyepiece optical system Li is bent twice.

Subsequently, numerical data of optical members constituting the eyepiece optical system of the twelfth embodiment are shown below.

Numerical Data 12

| | | | |
|---|---|---|---|
| $r_1 = -11.8398$ (aspherical surface) | $d_1 = 9.2820$ | $n_{d1} = 1.58874$ | $v_{d1} = 30.49$ |
| $r_2 = 8.9434$ | $d_2 = D2$ | | |
| $r_3 = 7.6209$ (aspherical surface) | $d_3 = 2.7684$ | $n_{d3} = 1.49445$ | $v_{d3} = 57.66$ |
| $r_4 = -63.3262$ | $d_4 = D4$ | | |
| $r_5 = 15.1681$ (aspherical surface) | $d_5 = 1.9519$ | $n_{d5} = 1.49445$ | $v_{d5} = 57.66$ |
| $r_6 = -24.2342$ | $d_6 = D6$ | | |
| $r_7 = 16.8854$ | $d_7 = 9.9576$ | $n_{d7} = 1.49445$ | $v_{d7} = 57.66$ |
| $r_8 = \infty$ (intermediate imaging plane) | $d_8 = D8$ | | |
| $r_9 = -4.3222$ (aspherical surface) | $d_9 = 2.2386$ | $n_{d9} = 1.58874$ | $v_{d9} = 30.49$ |
| $r_{10} = -5.1674$ | $d_{10} = 1.2993$ | | |
| $r_{11} = -27.3374$ | $d_{11} = 2.1027$ | $n_{d11} = 1.5277$ | $v_{d11} = 55.78$ |
| $r_{12} = -6.6025$ | $d_{12} = 0.5857$ | | |
| $r_{13} = -5.4470$ | $d_{13} = 0.4057$ | $n_{d13} = 1.58874$ | $v_{d13} = 30.49$ |
| $r_{14} = -6.9106$ | $d_{14} = D14$ | | |
| $r_{15} = -61.1673$ | $d_{15} = 18.5000$ | $n_{d15} = 1.49445$ | $v_{d15} = 57.66$ |
| $r_{16} = -11.7498$ (aspherical surface) | $d_{16} = 16.5000$ | | |

-continued

|  | Wide-angle | Middle | Telephoto |
|---|---|---|---|
| (Variable spacings) | | | |
| D2 | 9.5035 | 3.5866 | 1.2755 |
| D4 | 8.7566 | 7.2943 | 1.0102 |
| D6 | 3.1540 | 10.5333 | 19.1284 |
| (Variable spacings - diopter adjustment) (diopter at wide-angle position) | | | |
| D8 | 2.3685 | 1.6145 | 2.9760 |
| D14 | 0.8644 | 1.6185 | 0.2570 |
| Diopter | −0.90 | −3.11 | 1.11 |

Aspherical coefficients

First surface $K = 0$
$A_4 = 5.4727 \times 10^{-4}$       $A_6 = -9.5213 \times 10^{-6}$
$A_8 = 3.4976 \times 10^{-7}$       $A_{10} = -5.6586 \times 10^{-9}$ Third surface $K = 0$
$A_4 = -3.1878 \times 10^{-4}$      $A_6 = 3.8960 \times 10^{-7}$
$A_8 = -6.3108 \times 10^{-7}$      $A_{10} = 1.6765 \times 10^{-8}$ -continued Fifth surface $K = 0$
$A_4 = -2.8842 \times 10^{-4}$      $A_6 = 9.2119 \times 10^{-6}$
$A_8 = 7.4104 \times 10^{-8}$       $A_{10} = -9.0797 \times 10^{-9}$ Ninth surface $K = 0$
$A_4 = 4.3498 \times 10^{-3}$       $A_6 = -6.7433 \times 10^{-4}$
$A_8 = 3.6999 \times 10^{-5}$       $A_{10} = 0$ Sixteenth surface $K = 0$
$A_4 = 1.0408 \times 10^{-4}$       $A_6 = -3.8608 \times 10^{-6}$
$A_8 = 1.3352 \times 10^{-7}$       $A_{10} = -2.0120 \times 10^{-9}$ Subsequently, values of parameters of the conditions in the above embodiments and other design values are listed in Tables 1–4.

Also, the dimensions of the focal length, the rear principal point, the eye relief, the intermediate image height the maximum height of the chief ray at the maximum field angle, and the radius of curvature are all in millimeters.

TABLE 1

|  | 1st embodiment | 2nd embodiment | 3rd embodiment |
|---|---|---|---|
| Eyepiece optical system | | | |
| Focal length (fe) | 13.33 | 14.20 | 14.20 |
| Power (pe) | 0.07 | 0.07 | 0.07 |
| Rear principal pint | −11.17 | −2.23 | −6.25 |
| Eye relief (le) | 16.59 | 16.50 | 16.50 |
| Intermediate image height (ch) | 2.52 | 2.52 | 2.52 |
| Max. height of chief ray at max. field angle (Hh) | 4.01 | 3.66 | 3.61 |
| le/ch | 6.58 | 6.55 | 6.55 |
| fe/le | 0.80 | 0.81 | 0.81 |
| Diopter adjusting optical system (moving section) | | | |
| Focal length | 15.05 | 99.69 | 129.83 |
| Power (pd) | 0.07 | 0.01 | 0.01 |
| pd/pe | 0.89 | 0.14 | 0.11 |
| \|pd/pe\| | 0.89 | 0.14 | 0.11 |
| 1st lens unit of eyepiece optical system | | | |
| Radius of curvature of 1st surface (r11) | −8.54230 | −9.50540 | −11.44940 |
| Radius of curvature of 2nd surface (r12) | −13.48460 | 11.07420 | 40.49100 |
| sf1 = (r11 + r12)/(r11 − r12) | −4.46 | −0.08 | −0.56 |
| Focal length (fe1) | −47.21 | −8.34 | −14.95 |
| fe/le | −3.54 | −0.59 | −1.05 |
| 2nd lens unit of eyepiece optical system | | | |
| Radius of curvature of 1st surface (r21) | 38.48500 | 11.51860 | 40.49100 |
| Radius of curvature of 2nd surface (r22) | −7.54500 | −8.12410 | −9.41450 |
| sf2 = (r21 + r22)/(r21 − r22) | 0.67 | 0.17 | 0.62 |
| Focal length (fe2) | 13.082 | 10.275 | 15.762 |
| fe2/le | 16.27 | 12.71 | 19.50 |
| Eye relief (le) | 16.59 | 16.50 | 16.50 |
| Intermediate image height (ch) | 2.52 | 2.52 | 2.52 |

TABLE 2

|  | 4th embodiment | 5th embodiment | 6th embodiment |
|---|---|---|---|
| Eyepiece optical system | | | |
| Focal length (fe) | 14.20 | 16.04 | 16.33 |
| Power (pe) | 0.07 | 0.06 | 0.06 |
| Rear principal pint | −4.94 | −10.97 | −0.82 |

TABLE 2-continued

|  | 4th embodiment | 5th embodiment | 6th embodiment |
|---|---|---|---|
| Eye relief (le) | 16.50 | 16.50 | 16.50 |
| Intermediate image height (ch) | 2.52 | 2.52 | 2.52 |
| Max. height of chief ray at max. field angle (Hh) | 3.65 | 4.06 | 3.68 |
| le/ch | 6.55 | 6.55 | 6.55 |
| fe/le | 0.86 | 0.97 | 0.99 |
| Diopter adjusting optical system (moving section) | | | |
| Focal length | 32.87 | 100.86 | 83.04 |
| Power (pd) | 0.03 | 0.01 | 0.01 |
| pd/pe | 0.43 | 0.16 | 0.20 |
| \|pd/pe\| | 0.43 | 0.16 | 0.20 |
| 1st lens unit of eyepiece optical system | | | |
| Radius of curvature of 1st surface (r11) | −8.23720 | −4.55840 | −6.62440 |
| Radius of curvature of 2nd surface (r12) | −59.10290 | 118.97390 | 12.65580 |
| sf1 = (r11 + r12)/(r11 − r12) | −1.32 | −0.93 | −0.31 |
| Focal length (fe1) | −16.58 | −7.44 | −6.98 |
| fe/le | −1.17 | −0.46 | −0.43 |
| 2nd lens unit of eyepiece optical system | | | |
| Radius of curvature of 1st surface (r21) | 67.18540 | 208.55280 | 15.39580 |
| Radius of curvature of 2nd surface (r22) | −8.51640 | −4.68430 | −5.95510 |
| sf2 = (r21 + r22)/(r21 − r22) | 0.78 | 0.96 | 0.44 |
| Focal length (fe2) | 15.471 | 9.307 | 9.081 |
| fe2/le | 17.98 | 9.57 | 9.18 |
| Eye relief (le) | 16.50 | 16.50 | 16.50 |
| Intermediate image height (ch) | 2.52 | 2.52 | 2.52 |

TABLE 3

|  | 7th embodiment | 8th embodiment | 9th embodiment |
|---|---|---|---|
| Objective optical system | | | |
| Focal length (wide-angle position) | 5.03 | 5.03 | 5.03 |
| Focal length (telephoto position) | 14.52 | 14.52 | 14.52 |
| Zoom ratio | 2.89 | 2.89 | 2.89 |
| Eyepiece optical system | | | |
| Focal length (fe) | 12.70 | 12.96 | 13.09 |
| Power (pe) | 0.08 | 0.08 | 0.08 |
| Rear principal point | 3.17 | 1.13 | 11.20 |
| Finder magnification (wide-angle position) | 0.40 | 0.39 | 0.38 |
| Finder magnification (telephoto position) | 1.14 | 1.12 | 1.11 |
| Eye relief (le) | 16.50 | 16.50 | 16.50 |
| Intermediate image height (ch) | 2.16 | 2.18 | 2.17 |
| Max. height of chief ray at max. field angle (Hh) | 3.64 | 3.48 | 3.40 |
| le/ch | 7.63 | 7.55 | 7.61 |
| fe/le | 0.77 | 0.79 | 0.79 |
| Diopter adjusting optical system (moving section) | | | |
| Focal length | −65.56 | 63.19 | −4.33 |
| Power (pd) | −0.02 | 0.02 | −0.23 |
| pd/pe | −0.19 | 0.21 | −3.02 |
| \|pd/pe\| | 0.19 | 0.21 | 3.02 |
| 1st lens unit of eyepiece optical system | | | |
| Radius of curvature of 1st surface (r11) | −4.32220 | −4.32220 | −3.43410 |
| Radius of curvature of 2nd surface (r12) | 19.65970 | −47.25430 | 10.35400 |
| sf1 = (r11 + r12)/(r11 − r12) | −0.64 | −1.20 | −0.50 |
| Focal length (fe1) | −5.97 | −8.17 | −4.33 |
| fe1/le | −0.47 | −0.63 | −0.33 |
| 2nd lens unit of eyepiece optical system | | | |
| Radius of curvature of 1st surface (r21) | −238.11370 | −11.90070 | −43.21170 |
| Radius of curvature of 2nd surface (r22) | −5.40040 | −5.70640 | −5.15040 |
| sf2 = (r21 + r22)/(r21 − r22) | 1.05 | 2.84 | 1.27 |
| Focal length (fe2) | 10.413 | 19.057 | 10.807 |
| fe2/le | 13.53 | 24.26 | 0.83 |

TABLE 4

|  | 10th embodiment | 11th embodiment | 12th embodiment |
|---|---|---|---|
| Objective optical system | | | |
| Focal length (wide-angle position) | 5.03 | 5.03 | 5.03 |
| Focal length (telephoto position) | 14.52 | 14.52 | 14.52 |
| Zoom ratio | 2.89 | 2.89 | 2.89 |
| Eyepiece optical system | | | |
| Focal length (fe) | 13.71 | 12.94 | 14.64 |
| Power (pe) | 0.07 | 0.08 | 0.07 |
| Rear principal point | −2.09 | 5.02 | −4.54 |
| Finder magnification (wide-angle position) | 0.37 | 0.39 | 0.34 |
| Finder magnification (telephoto position) | 1.06 | 1.12 | 0.99 |
| Eye relief (le) | 16.50 | 16.50 | 16.50 |
| Intermediate image height (ch) | 2.33 | 2.16 | 2.25 |
| Max. height of chief ray at max. field angle (Hh) | 3.57 | 3.47 | 3.26 |
| le/ch | 7.08 | 7.66 | 7.33 |
| fe/le | 0.83 | 0.78 | 0.89 |
| Diopter adjusting optical system (moving section) | | | |
| Focal length | 37.80 | −49.29 | 20.59 |
| Power (pd) | 0.03 | −0.02 | 0.05 |
| pd/pe | 0.36 | −0.26 | 0.71 |
| \|pd/pe\| | 0.36 | 0.26 | 0.71 |
| 1st lens unit of eyepiece optical system | | | |
| Radius of curvature of 1st surface (r11) | −5.01610 | −4.32220 | −4.32220 |
| Radius of curvature of 2nd surface (r12) | −6.14630 | 17.11790 | −5.16740 |
| sf1 = (r11 + r12)/(r11 − r12) | −9.88 | −0.60 | −11.23 |
| Focal length (fe1) | −111.19 | −5.81 | −2437.25 |
| fe1/le | −8.11 | −0.45 | −166.47 |
| 2nd lens unit of eyepiece optical system | | | |
| Radius of curvature of 1st surface (r21) | −6.14630 | −199.01840 | −27.33740 |
| Radius of curvature of 2nd surface (r22) | −5.25030 | −5.47750 | −6.60250 |
| sf2 = (r21 + r22)/(r21 − r22) | 12.72 | 1.06 | 1.64 |
| Focal length (fe2) | 33.612 | 10.603 | 15.938 |
| fe2/le | 2.45 | 0.82 | 1.09 |

What is claimed is:

1. An eyepiece optical system comprising:
   a first lens unit; and
   a second lens unit,
   the first lens unit and the second lens unit being arranged in this order from an intermediate-image side toward a pupil side,
   wherein the first lens unit includes a negative lens, the negative lens being located at a position closest to an intermediate image, and the second lens unit includes a path-bending optical member and has positive power as a whole, satisfying the following condition:

$$-20 < sf1 < 0$$

where sf1 is a shaping factor of the negative lens and is expressed as (r11+r12)/(r11−r12), where r11 is a radius of curvature of an intermediate-image-side surface of the negative lens and r12 is a radius of curvature of a pupil-side surface of the negative lens.

2. An eyepiece optical system according to claim 1, further satisfying the following condition:

$$0.1 < fe/le < 1$$

where fe is a focal length of a whole of the eyepiece optical system and le is an eye relief of the eyepiece optical system.

3. An eyepiece optical system according to claim 1, wherein the first lens unit has a diopter adjusting optical system, the diopter adjusting optical system including at lest one lens moved along an optical axis for diopter adjustment, satisfying the following condition:

$$0.1 < |pd/pe| < 0.7$$

where pd is a power of the diopter adjusting optical system and pe is a power of a whole of the eyepiece optical system.

4. An eyepiece optical system according to claim 1, wherein the first lens unit is provided with a second lens from the intermediate image, the second lens having positive power.

5. An eyepiece optical system according to claim 4, satisfying the following condition:

$$0 < sf2 < 20$$

where sf2 is a shaping factor of the second lens from the intermediate image and is expressed as (r21+r22)/(r21−r22), where r21 is a radius of curvature of the intermediate-image-side surface of the second lens from the intermediate image and r22 is a radius of curvature of the pupil-side surface of the second lens from the intermediate image.

6. An eyepiece optical system according to claim 4, wherein the first lens unit is provided with a diopter adjusting optical system, the diopter adjusting optical system having the negative lens and the second lens from the intermediate image.

7. An eyepiece optical system according to claim 6, wherein the negative lens and the second lens is configured as a cemented lens.

8. An eyepiece optical system according to claim 4, wherein the second lens has a diffraction surface on the pupil side.

9. An eyepiece optical system according to claim 1, further comprising two reflecting surfaces.

10. A real image mode finder optical system having an eyepiece optical system, the eyepiece optical system comprising:

a first lens unit; and a second lens unit, the first lens unit and the second lens unit being arranged in this order from an intermediate-image side toward a pupil side, wherein the first lens unit includes a negative lens, the negative lens being located at a position closest to an intermediate image, and the second lens unit includes a path-bending optical member and has positive power as a whole, satisfying the following condition:

$$-20 \le sf1 < 0$$

where sf1 is a shaping factor of the negative lens and is expressed as $(r11+r12)/(r11-r12)$, where r11 is a radius of curvature of an intermediate-image-side surface of the negative lens and r12 is a radius of curvature of a pupil-side surface of the negative lens, and wherein the real image mode finder optical system satisfies the following condition:

$$6 < le/ch < 10$$

where le is an eye relief of the eyepiece optical system and ch is a height of the intermediate image.

11. A real image mode finder optical system comprising:

an objective optical system forming an intermediate image; and an eyepiece optical system comprising:

a first lens unit; and a second lens unit, the first lens unit and the second lens unit being arranged in this order from an intermediate-image side toward a pupil side, wherein the first lens unit includes a negative lens, the negative lens being located at a position closest to the intermediate image, and the second lens unit includes a path-bending optical member and has positive power as a whole, satisfying the following condition:

$$-20 \le sf1 < 0$$

where sf1 is a shaping factor of the negative lens and is expressed as $(r11+r12)/(r11-r12)$, where r11 is a radius of curvature of an intermediate-image-side surface of the negative lens and r12 is a radius of curvature of a pupil-side surface of the negative lens, wherein the objective optical system has a positive power lens, the positive power lens being located at a position closest to the intermediate.

12. A real image mode finder optical system according to claim 11, wherein the objective optical system comprises:

a first lens unit with negative power, the first lens unit having a single reflecting surface, a second lens unit with positive power, the second lens unit being moved to change a magnification, and a last lens unit located at a position closest to the intermediate image, the last lens unit having positive power and a single reflecting surface.

13. A real image mode finder optical system according to claim 11, wherein the objective optical system is used as a photographing optical system, and the real image mode finder optical system is a TTL finder optical system for observing a real image of an object formed through the objective optical system and satisfies the following condition:

$$0.5 \text{ mm} < ch < 2.6 \text{ mm}$$

where ch is a height of the intermediate image.

14. An imaging device including a real image mode finder optical system, the real image mode finder optical system having an eyepiece optical system, the eyepiece optical system comprising:

a first lens unit; and a second lens unit, the first lens unit and the second lens unit being arranged in this order from an intermediate-image side toward a pupil side, wherein the first lens unit includes a negative lens, the negative lens being located at a position closest to an intermediate image, and the second lens unit includes a path-bending optical member and has positive power as a whole, satisfying the following condition:

$$-20 \le sf1 < 0$$

where sf1 is a shaping factor of the negative lens and is expressed as $(r11+r12)/(r11-r12)$, where r11 is a radius of curvature of an intermediate-image-side surface of the negative lens and r12 is a radius of curvature of a pupil-side surface of the negative lens, and wherein the real image mode finder optical system satisfies the following condition:

$$6 < le/ch < 10$$

where le is an eye relief of the eyepiece optical system and ch is a height of the intermediate image.

15. An imaging device including a real image mode finder optical system, the real image mode finder optical system comprising:

an objective optical system forming an intermediate image; and an eyepiece optical system comprising:

a first lens unit; and a second lens unit, the first lens unit and the second lens unit being arranged in this order from an intermediate-image side toward a pupil side, wherein the first lens unit includes a negative lens, the negative lens being located at a position closest to the intermediate image, and the second lens unit includes a path-bending optical member and has positive power as a whole, satisfying the following condition:

$$-20 \le sf1 < 0$$

where sf1 is a shaping factor of the negative lens and is expressed as $(r11+r12)/(r11-r12)$, where r11 is a radius of curvature of an intermediate-image-side surface of the negative lens and r12 is a radius of curvature of a pupil-side surface of the negative lens, wherein the objective optical system has a positive power lens, the positive power lens being located at a position closest to the intermediate.

* * * * *